United States Patent
Shimahashi et al.

(10) Patent No.: US 9,264,577 B2
(45) Date of Patent: Feb. 16, 2016

(54) IMAGE PROCESSING DEVICE GENERATING COMBINED IMAGE DATA BY CALCULATING DEGREE OF SIMILARITY BETWEEN TWO IMAGES

(71) Applicant: BROTHER KOGYO KABUSHIKI KAISHA, Nagoya, Aichi (JP)

(72) Inventors: Takuya Shimahashi, Nagoya (JP); Tomohiko Hasegawa, Okazaki (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/725,134

(22) Filed: May 29, 2015

(65) Prior Publication Data
US 2015/0350490 A1 Dec. 3, 2015

(30) Foreign Application Priority Data
May 30, 2014 (JP) .................................. 2014-113431

(51) Int. Cl.
*H04N 1/387* (2006.01)
*G06T 7/00* (2006.01)
*H04N 1/00* (2006.01)
*H04N 1/047* (2006.01)
*G06K 9/20* (2006.01)

(52) U.S. Cl.
CPC .............. *H04N 1/3876* (2013.01); *G06T 7/003* (2013.01); *H04N 1/00973* (2013.01); *H04N 1/047* (2013.01); *H04N 1/3871* (2013.01); *G06K 2009/2045* (2013.01); *H04N 2201/0094* (2013.01)

(58) Field of Classification Search
None
See application file for complete search history.

(56) References Cited

U.S. PATENT DOCUMENTS

| 5,140,647 | A | * | 8/1992 | Ise | H04N 1/3876 382/284 |
| 5,465,163 | A | * | 11/1995 | Yoshihara | H04N 1/3876 358/450 |
| 5,721,624 | A | * | 2/1998 | Kumashiro | H04N 1/3876 358/450 |
| 6,148,118 | A | * | 11/2000 | Murakami | H04N 1/3876 358/450 |
| 6,331,860 | B1 | * | 12/2001 | Knox | H04N 1/3876 345/629 |
| 6,763,125 | B2 | * | 7/2004 | Ohta | G06T 7/0022 382/286 |
| 7,813,589 | B2 | * | 10/2010 | Silverstein | G06T 5/50 382/284 |
| 8,275,215 | B2 | * | 9/2012 | Mei | G06T 11/60 382/284 |

FOREIGN PATENT DOCUMENTS

JP 04-290066 A 10/1992

* cited by examiner

*Primary Examiner* — Scott A Rogers
(74) *Attorney, Agent, or Firm* — Scully, Scott, Murphy & Presser, PC

(57) ABSTRACT

An image processing device performs: calculating a degree of similarity between a reference region in a first image and a candidate region in a second image; identifying a corresponding region in the second image; determining whether a first variance condition is met; and generating combined image data representing a combined image in which the first image is combined with the second image by overlapping the reference region with the corresponding region. In a first case where the first variance condition is met, once the calculating finds the degree of similarity greater than or equal to a reference value, the candidate region corresponding to the degree of similarity is identified with the corresponding region. In a second case where the first condition is not met, the identifying identifies a candidate region having a maximum degree of similarity with the corresponding region.

9 Claims, 12 Drawing Sheets

ORIGINAL

UI SCREEN

LEFT-SIDE SCANNED IMAGE

RIGHT-SIDE SCANNED IMAGE

COMBINED IMAGE $$V = \sum_{n=1}^{8} (\Delta V_n)$$

$$\Delta V_n = (|R_n - R_0| + |G_n - G_0| + |B_n - B_0|)$$

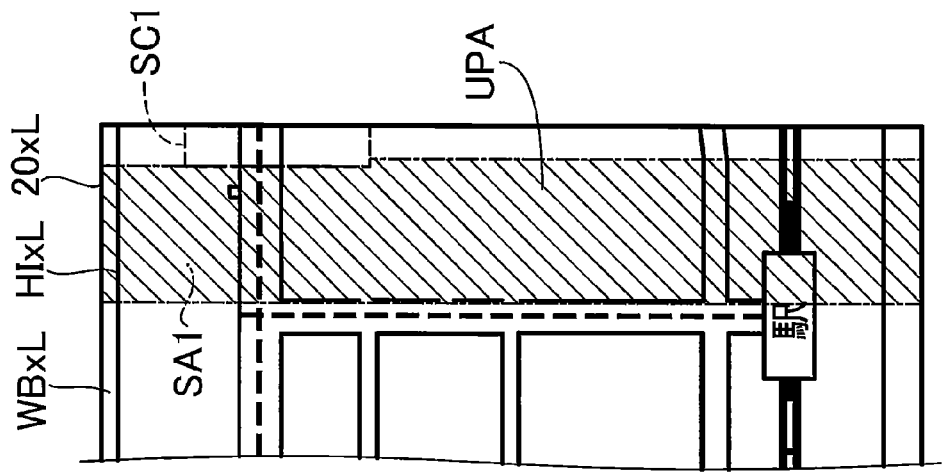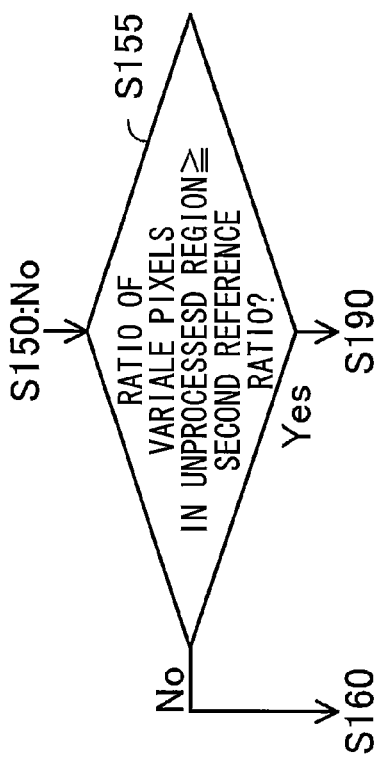

IMAGE PROCESSING DEVICE GENERATING COMBINED IMAGE DATA BY CALCULATING DEGREE OF SIMILARITY BETWEEN TWO IMAGES

CROSS REFERENCE TO RELATED APPLICATION

This application claims priority from Japanese Patent Application No. 2014-113431 filed May 30, 2014. The entire content of the priority application is incorporated herein by reference.

TECHNICAL FIELD

The present disclosure relates to a technique for generating image data representing a single image formed by combining a first image and a second image.

BACKGROUND

There are known technologies for generating image data representing a combined image formed by joining a first image with a second image. For example, one image processing device known in the art uses a scanner to perform two passes over an original that is too large to read in one pass, acquiring scan data representing a first image and scan data representing a second image. On the basis of two sets of scan data, the conventional image processing device generates image data representing a combined image formed by combining the first and second images. In this case, a pattern matching is used to determine a joining position at which the first and second images are combined.

SUMMARY

However, the image-processing device described above performs the same image process to join the first image with the second image regardless of what images are represented by the two sets of scan data. Consequently, there is a possibility of reduced precision in setting the joining positions of the first and second images.

In view of the foregoing, it is an object of the present disclosure to provide a technique for setting the joining positions of a first image and a second image without a drop in positioning precision when generating combined image data representing a combined image in which the first image is joined with the second image.

In order to attain the above and other objects, the disclosure provides an image processing device. The image processing device includes a processor; and a memory storing computer-readable instructions therein. The computer-readable instructions, when executed by the processor, causes the image processing device to perform: acquiring first image data representing a first image having a plurality of pixels and second image data representing a second image having a plurality of pixels, the second image including a search region, a plurality of candidate regions being included in a part of the search region; selecting a candidate region from among the plurality of candidate regions in the search region; calculating, for the selected candidate region, a degree of similarity between a reference region and the selected candidate region, the reference region being a part of the first image; identifying a corresponding region in the search region, the corresponding region corresponding to the reference region; determining whether a first variance condition is met, the first variance condition indicating that variance among pixel values of pixels in a determination region is greater than or equal to a prescribed first value, the determination region including at least one of at least a part of the search region and at least a part of the reference region; and generating combined image data by using the first image data and the second image data, the combined image data representing a combined image in which the first image is combined with the second image by overlapping the reference region with the identified corresponding region. In a first case where the first variance condition is met, the calculating is repeatedly performed while the selecting changes a selection of a candidate region from among the plurality of candidate regions until the calculating finds a degree of similarity greater than or equal to a reference value. In the first case, once the calculating finds the degree of similarity greater than or equal to the reference value, the candidate region corresponding to the found degree of similarity is identified with the corresponding region. In a second case where the first variance condition is not met, the calculating is repeatedly performed while the selecting changes a selection of a candidate region from among the plurality of candidate regions to obtain at least two degrees of similarity for at least two candidate regions among the plurality of candidate regions. In the second case, the identifying identifies a candidate region having a maximum degree of similarity among the at least two degrees of similarity with the corresponding region.

According to another aspect, the present disclosure provides a non-transitory computer readable storage medium storing a set of program instructions installed on and executed by a computer. The program instructions includes: acquiring first image data representing a first image having a plurality of pixels and second image data representing a second image having a plurality of pixels, the second image including a search region, a plurality of candidate regions being included in a part of the search region; selecting a candidate region from among the plurality of candidate regions in the search region; calculating, for the selected candidate region, a degree of similarity between a reference region and the selected candidate region, the reference region being a part of the first image; identifying a corresponding region in the search region, the corresponding region corresponding to the reference region; determining whether a first variance condition is met, the first variance condition indicating that variance among pixel values of pixels in a determination region is greater than or equal to a prescribed first value, the determination region including at least one of at least a part of the search region and at least a part of the reference region; and generating combined image data by using the first image data and the second image data, the combined image data representing a combined image in which the first image is combined with the second image by overlapping the reference region with the identified corresponding region. In a first case where the first variance condition is met, the calculating is repeatedly performed while the selecting changes a selection of a candidate region from among the plurality of candidate regions until the calculating finds a degree of similarity greater than or equal to a reference value. In the first case, once the calculating finds the degree of similarity greater than or equal to the reference value, the candidate region corresponding to the found degree of similarity is identified with the corresponding region. In a second case where the first variance condition is not met, the calculating is repeatedly performed while the selecting changes a selection of a candidate region from among the plurality of candidate regions to obtain at least two degrees of similarity for at least two candidate regions among the plurality of candidate regions. In the second case, the identifying identifies a candidate region having a maximum degree of similarity among the at least two degrees of similarity with the corresponding region.

According to still another aspect, the present disclosure provides a method. The method includes: acquiring first image data representing a first image having a plurality of pixels and second image data representing a second image having a plurality of pixels, the second image including a search region, a plurality of candidate regions being included in a part of the search region; selecting a candidate region from among the plurality of candidate regions in the search region; calculating, for the selected candidate region, a degree of similarity between a reference region and the selected candidate region, the reference region being a part of the first image; identifying a corresponding region in the search region, the corresponding region corresponding to the reference region; determining whether a first variance condition is met, the first variance condition indicating that variance among pixel values of pixels in a determination region is greater than or equal to a prescribed first value, the determination region including at least one of at least a part of the search region and at least a part of the reference region; and generating combined image data by using the first image data and the second image data, the combined image data representing a combined image in which the first image is combined with the second image by overlapping the reference region with the identified corresponding region. In a first case where the first variance condition is met, the calculating is repeatedly performed while the selecting changes a selection of a candidate region from among the plurality of candidate regions until the calculating finds a degree of similarity greater than or equal to a reference value. In the first case, once the calculating finds the degree of similarity greater than or equal to the reference value, the candidate region corresponding to the found degree of similarity is identified with the corresponding region. In a second case where the first variance condition is not met, the calculating is repeatedly performed while the selecting changes a selection of a candidate region from among the plurality of candidate regions to obtain at least two degrees of similarity for at least two candidate regions among the plurality of candidate regions. In the second case, the identifying identifies a candidate region having a maximum degree of similarity among the at least two degrees of similarity with the corresponding region.

BRIEF DESCRIPTION OF THE DRAWINGS

The particular features and advantages of the disclosure as well as other objects will become apparent from the following description taken in connection with the accompanying drawings, in which:

FIG. 17(A) is a part of a flowchart for a matching region setting process according to a fifth embodiment;

FIG. 17(B) is a schematic diagram illustrating the matching region setting process according to the fifth embodiment.

DETAILED DESCRIPTION

A. First Embodiment

A-1: Structure of an Image Processing System

Figure 1:
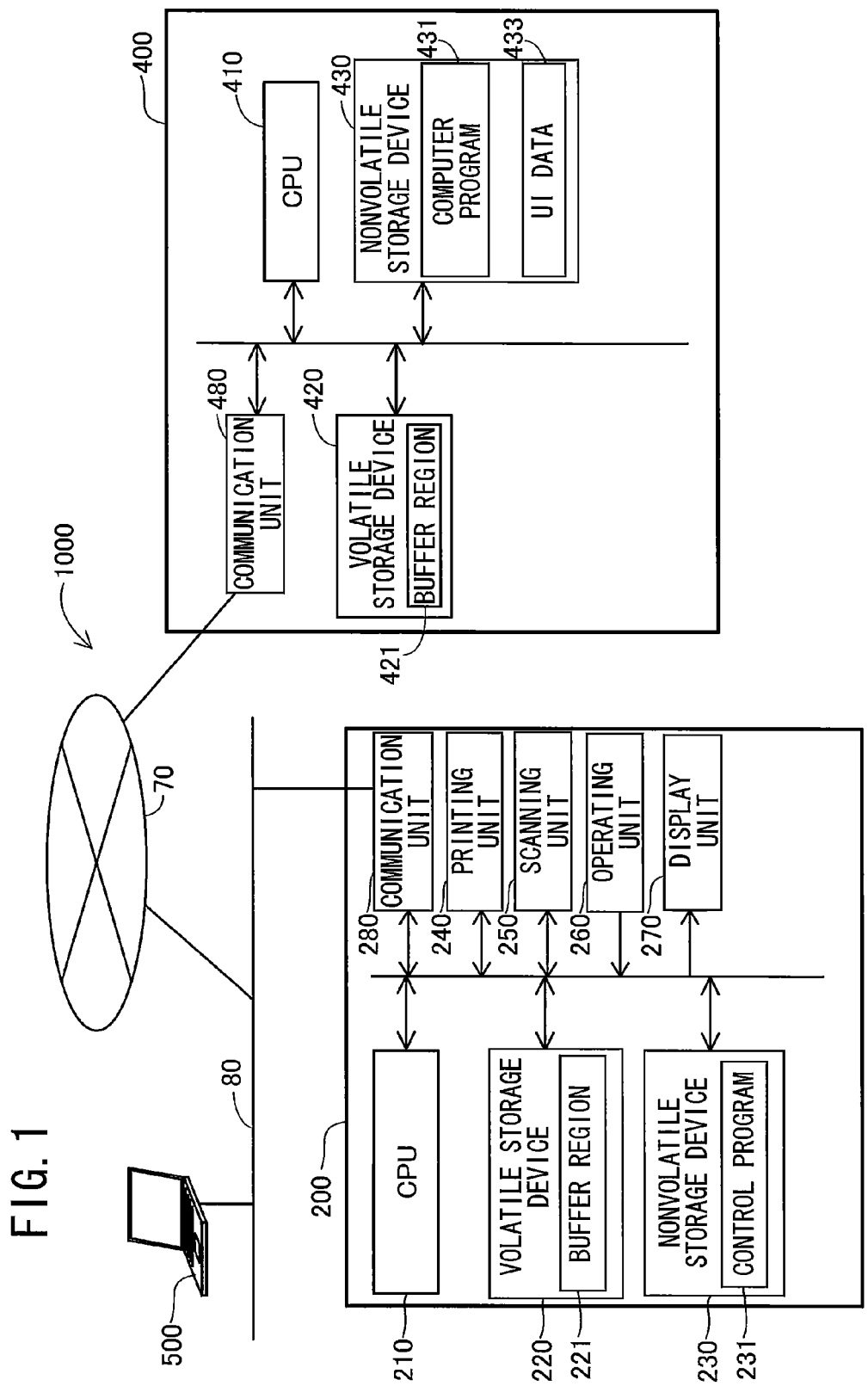
FIG. 1 is a block diagram showing a structure of an image processing system according to a first embodiment.

FIG. 1 is a block diagram showing the structure of an image processing system 1000 according to a first embodiment. The image processing system 1000 is configured of a server 400 functioning as an image processing device, and a multifunction peripheral 200. The server 400 is connected to an Internet 70. The multifunction peripheral 200 is also connected to the Internet 70 via a local area network (LAN) 80. Consequently, the server 400 and the multifunction peripheral 200 can communicate with each other via the LAN 80 and the Internet 70. Further, a personal computer 500 possessed by the user of the multifunction peripheral 200 may be connected to the LAN 80.

The server 400 includes a CPU 410 as an example of the processor for the server 400; a volatile storage device 420, such as DRAM; a nonvolatile storage device 430, such as a hard disk drive or flash memory; and a communication unit 480 including an interface for connecting to the Internet 70 or other networks. The volatile storage device 420 is provided with a buffer region 421 for temporarily storing various intermediate data generated when the CPU 410 performs processes. The nonvolatile storage device 430 stores a computer program 431, and user interface (UI) data 433.

The computer program 431 and the UI data 433 are installed on the server 400 by the administrator of the server 400, for example, by uploading this data to the server 400 through the Internet 70. Alternatively, the computer program 431 and the UI data 433 may be supplied on a DVD-ROM or other storage media and installed on the server 400 by the administrator. The CPU 410 executes the computer program 431 to implement an image process described later.

The multifunction peripheral 200 includes a CPU 210; a volatile storage device 220, such as DRAM; a nonvolatile storage device 230, such as flash memory or a hard disk drive;

a printing unit 240; a scanning unit 250; an operating unit 260, such as a touchscreen, buttons, or the like; a display unit 270, such as a liquid crystal display; and a communication unit 280 for communicating with external devices. The communication unit 280 includes an interface for connecting to the LAN 80 or another network, and an interface for connecting to an external storage device, such as a USB memory.

The volatile storage device 220 is provided with a buffer region 221 that temporarily stores various data generated when the CPU 210 performs processes. The nonvolatile storage device 230 stores a control program 231.

The printing unit 240 executes printing operations according to an inkjet or laser printing method, for example. The scanning unit 250 produces scan data representing a color or grayscale image by optically reading an original using a photoelectric conversion element such as a CCD (Charge Coupled device) sensor or CMOS (Complementary Metal-Oxide Semiconductor) sensor. The scanning unit 250 is provided with a flatbed type platen. The platen has a substantially rectangular shape including a longitudinal side and a short side that is shorter than and orthogonal to the longitudinal side. The longitudinal side of the platen is slightly longer (a few centimeters, for example) than the longitudinal dimension of an A4 size sheet, which is defined as 297 mm by ISO (abbreviation of International Organization for Standardization) 216 for international standard paper sizes. The short side of the platen is slightly greater (a few centimeters, for example) than the shorter side dimension of a "letter" size sheet, which is defined as 215.9 mm by ANSI/ASME (an abbreviation of American National Standards Institute/American Society of Mechanical Engineers) Y14.1. Hence, the maximum size of an original that can be read in one pass by the scanning unit 250 according to the first embodiment is larger than A4 size but smaller than A3 size, where A3 size is also a paper size defined by ISO 216. That is, the scanning unit 250 reads an area whose longitudinal dimension is slightly larger than the longitudinal dimension of an A4-size sheet and whose shorter side dimension is slightly larger than the shorter side dimension of a letter-size sheet, and generates image data representing an image having the original size. As will be described later, the scanning unit 250 can read an A3-size original, for example, in two passes such that both two read images include an overlap region corresponding to the longitudinal center region of the A3-size original.

The CPU 210 controls the multifunction peripheral 200 by executing the control program 231. For example, the CPU 210 can control the printing unit 240 and the scanning unit 250 to execute a copy process, a print process, and a scan process. Further, the CPU 210 can execute a service use process for accessing the server 400 to use services provided thereby.

A-2: Operations of the Image Processing System

Figure 2:
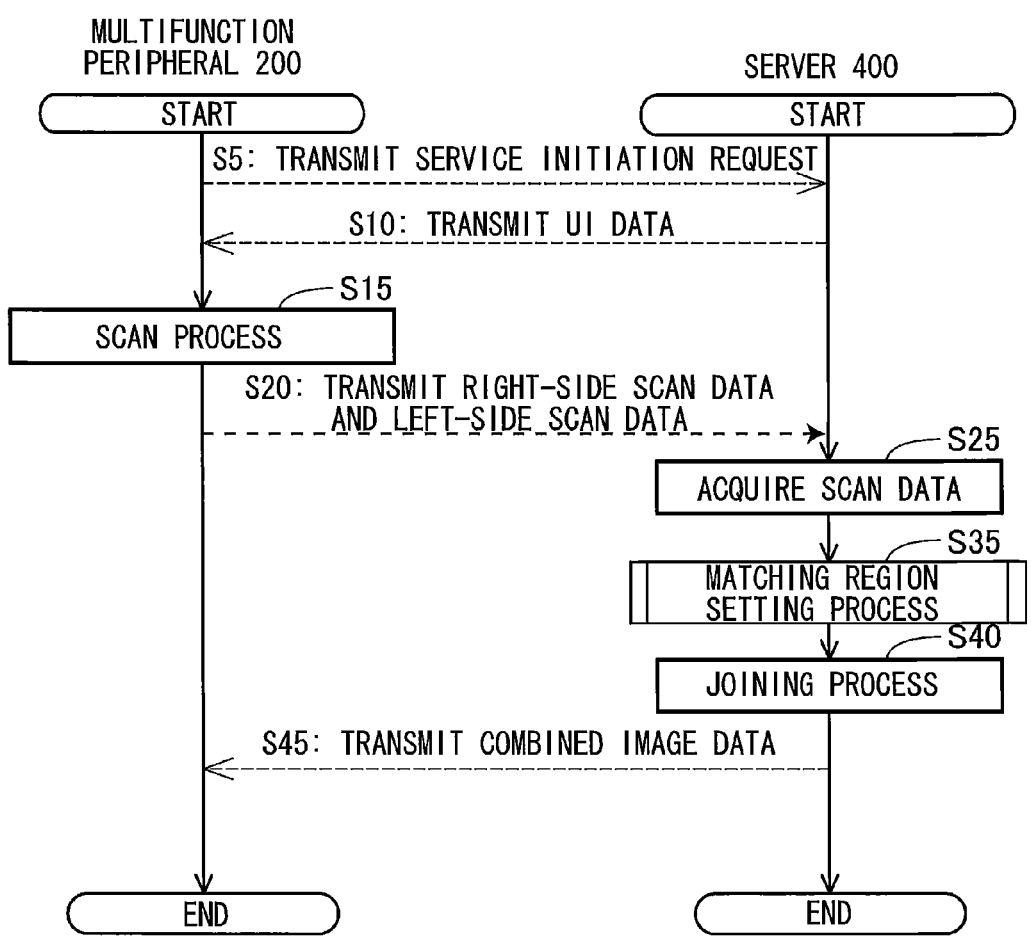
FIG. 2 is a sequence diagram illustrating a process performed by the image processing system.

FIG. 2 shows the sequence of operations performed by the image processing system 1000 for an image generation service. The multifunction peripheral 200 initiates the process in FIG. 2 upon receiving a command from the user to use the image generation service provided by the server 400. This service will be described later in greater detail and entails combining a plurality of scanned images represented by scan data obtained through a plurality of passes. As will be described later in greater detail, scan data acquired in a plurality of passes is generated when the scanning unit 250 performs a plurality of passes to read an original that is larger than the maximum size that the scanning unit 250 can read in one pass, for example.

In S5 at the beginning of the process in FIG. 2, the CPU 210 of the multifunction peripheral 200 transmits a service initiation request to the server 400. Upon receiving this request, the CPU 410 of the server 400 selects UI data required for providing the image generation service from the UI data 433 shown in FIG. 1 and in S10 transmits this UI data to the multifunction peripheral 200. The UI data specifically includes screen data representing a user interface screen (hereinafter called a "UI screen"), and control data. The control data includes various data required for the multifunction peripheral 200 to perform a prescribed process, such as the scan process described later in S15, using the UI screen. For example, the control data may include data that the multifunction peripheral 200 needs to perform such processes as transmitting scan data to the server 400 in response to a command received from the user via the UI screen (see FIG. 4, for example). The data that the multifunction peripheral 200 needs may include the destination address for the scan data.

In S15 the CPU 210 executes the scan process in response to the received UI data to generate scan data for a plurality of passes. That is, the CPU 210 performs two passes to read an original that the user has prepared in order to generate two sets of scan data. In the embodiment, scan data is RGB image data that includes RGB color component values represented in 256 gradations (from 0 to 255) for each pixel in the image.

Figure 3:
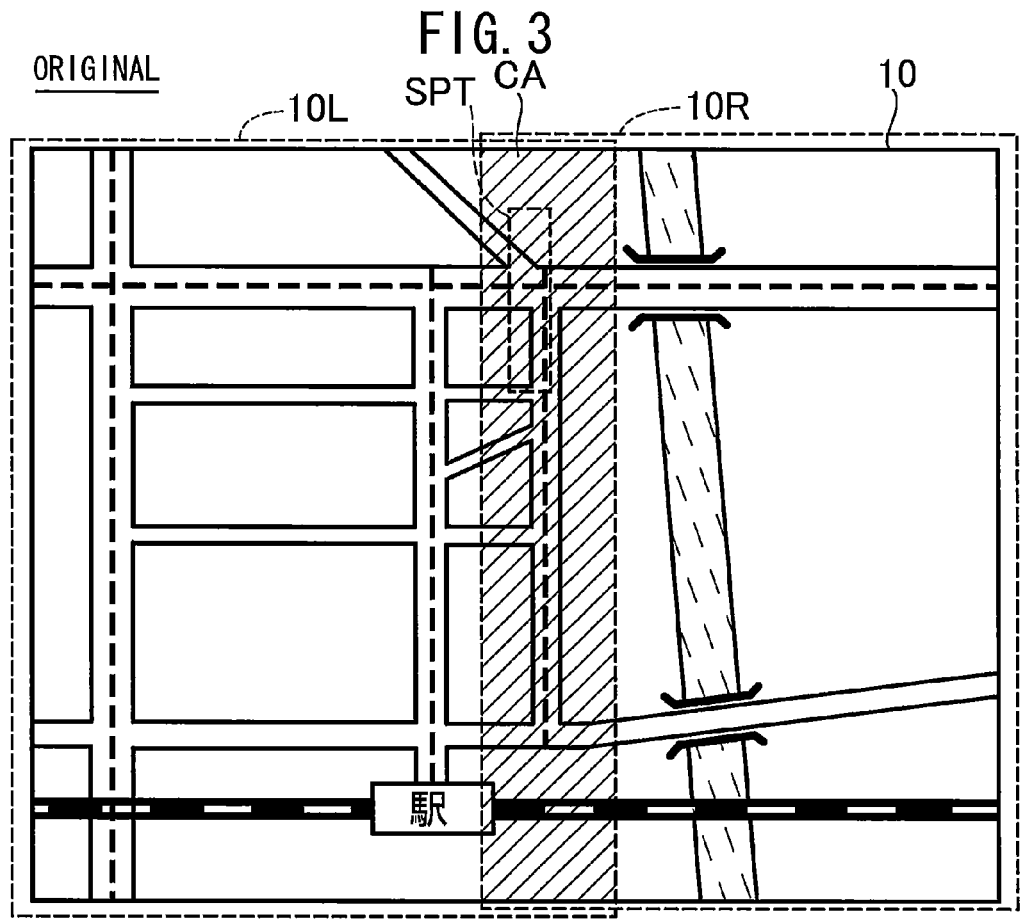
FIG. 3 is an explanatory diagram showing an example of an original.

FIG. 3 shows a sample of an original 10 used in the embodiment. The original 10 in FIG. 3 is approximately twice the size of an original that the scanning unit 250 can read in one pass. The maximum size that the scanning unit 250 can read in one pass in the embodiment is a size slightly larger than A4-size. The size of the original is A3-size in this embodiment.

Figure 4:
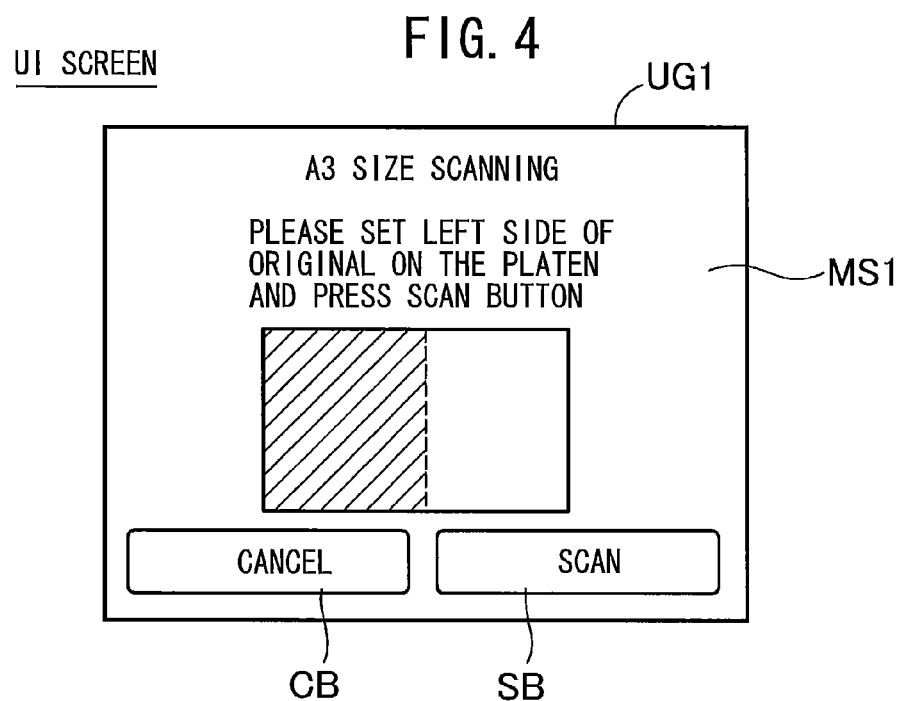
FIG. 4 is an explanatory diagram showing an example of a UI screen.

FIG. 4 shows a sample UI screen UG1. The CPU 210 displays the UI screen UG1 in FIG. 4 on the display unit 270. In this example, the UI screen UG1 includes a message MS 1 prompting the user to set the original 10 suitably on the platen, a scan button SB, and a cancel button CB. As indicated in the UI screen UG1, the user sets the original 10 on the platen so that the scanning unit 250 can read a left region 10L (see FIG. 3) constituting approximately the left half of the original 10, and presses the scan button SB. Once the user presses the scan button SB, the CPU 210 controls the scanning unit 250 to read the original 10 and generate left-side scan data.

Figure 5A:
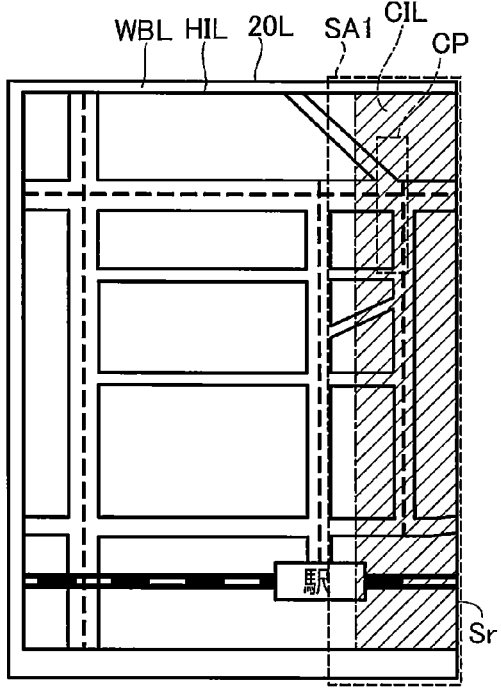
FIGS. 5(A) and 5(B) are explanatory diagrams respectively showing an example of a left-side scanned image and an example of a right side scanned image.

FIG. 5(A) shows a left-side scanned image 20L represented by the left-side scan data. Here, the left-side scanned image 20L includes a left-side original image HIL depicting the left region 10L of the original 10 shown in FIG. 3, and a white border WBL.

Next, the CPU 210 displays the prescribed UI screen (not shown) on the display unit 270. As with the UI screen UG1, this UI screen includes a message prompting the user to place the original 10 appropriately on the platen, a scan button, and a cancel button. The user places the original 10 on the platen according to the UI screen so that a right region 1 OR constituting the approximate right half of the original 10 shown in FIG. 3 can be read, and subsequently presses the scan button. In response to the user pressing the scan button, the CPU 210 controls the scanning unit 250 to read the original and to generate right-side scan data.

Figure 5B:
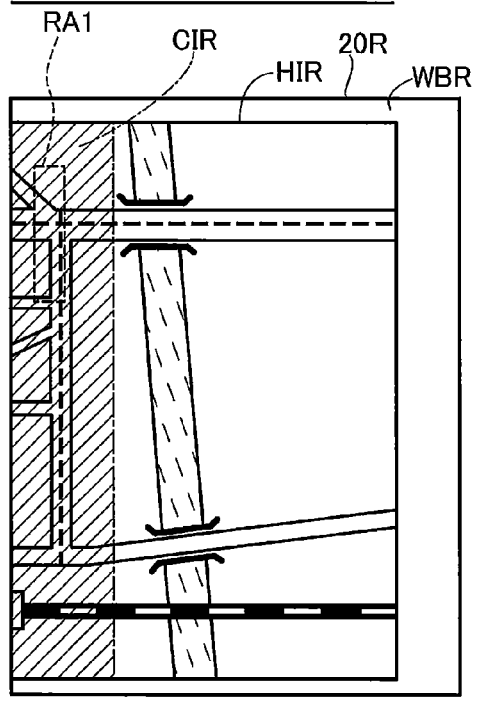

FIG. 5(B) shows a right-side scanned image 20R represented by the right-side scan data generated by the scanning unit 250. The right-side scanned image 20R includes a right original image HIR corresponding to the right region 10R of the original 10 shown in FIG. 3, and a white border WBR.

Here, an image representing the horizontal center portion CA of the original 10 in FIG. 3 is included in both the region along the right edge of the left-side scanned image 20L and the region along the left edge of the right-side scanned image 20R. In other words, as shown in FIGS. 5(A) and 5(B) with shading, the left-side scanned image 20L includes an image CIL representing the horizontal center portion CA of the original 10 and the right-side scanned image 20R includes an image CIR representing the horizontal center portion CA of the original 10. Here, the user may be instructed through the UI screen, the user's manual for the multifunction peripheral 200 and the like to place the original 10 on the platen such that the horizontal center portion CA can be read when generating both the left-side and right-side scan data. Note that while both the image CIL in the left-side scanned image 20L and the image CIR in the right-side scanned image 20R represent the horizontal center portion CA, some differences between them will arise in colors, areas, and etc. due to the position of the original 10 placed by the user on the platen and characteristics of the photoelectric conversion elements of the scanning unit 250.

Returning to FIG. 2, in S20 the CPU 210 transmits the right-side scan data representing the right-side scanned image 20R and the left-side scan data representing the left-side scanned image 20L to the server 400. Upon receiving this scan data, in S25 the CPU 410 of the server 400 acquires and stores the right-side scan data and the left-side scan data in the buffer region 421.

In S35 the CPU 410 executes a matching region setting process. In the matching region setting process, the CPU 410 identifies a matching region CP within the left-side scanned image 20L (see FIG. 5(A)) that corresponds to a reference region RA1, which is a partial region within the right-side scanned image 20R (see FIG. 5(B)). In the embodiment, the reference region RA1 is a predetermined region in the right-side scanned image 20R. The matching region CP corresponding to the reference region RA1 is defined as follows. A portion of the original 10 representing the reference region RA1 in the right-side scanned image 20R is set as a specific partial region image SPT (see FIG. 3). The matching region CP corresponding to the reference region RA1 is a region in the left-side scanned image 20L representing the specific partial region image SPT of the original 10. The matching region CP is set within a search region in the left-side scanned image 20L. As will be described later, a region in the left-side scanned image 20L representing an image that resembles the image in the reference region RA1 is used as the matching region CP. The matching region setting process will be described later in greater detail.

In S40 the CPU 410 executes a joining process. In the joining process, the CPU 410 uses the left-side and right-side scan data to generate combined image data representing a combined image 30 in which the right original image HIR in the right-side scanned image 20R is joined with a left original image HIL in the left-side scanned image 20L.

Figure 6:
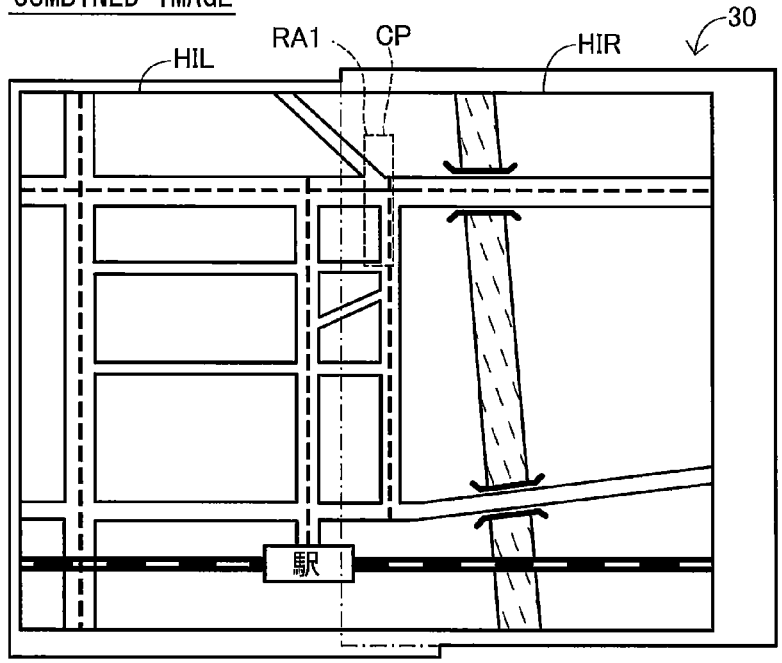
FIG. 6 is an explanatory diagram illustrating a combined image.

FIG. 6 shows a combined image 30 in which the two scanned images 20L and 20R shown in FIGS. 5(A) and 5(B) have been joined together. As shown in FIG. 6, the right original image HIR and the left original image HIL have been joined in the combined image 30A such that the reference region RA1 in the right original image HIR and the matching region CP in the left original image HIL are located at a same position. Here, component values for pixels in the right original image HIR (i.e., the right-side scanned image 20R), for example, are given priority when setting component values in the combined image 30 for pixels in the overlapping region of the right original image HIR and the left original image HIL. Joining the right original image HIR and the left original image HIL in this way produces the combined image 30 representing the original 10 in FIG. 3. The CPU 410 may perform a trimming process for cutting an edge of the combined image 30 such that outline of the trimmed image 30 has a rectangular shape.

Note that when a matching region CP corresponding to the reference region RA1 cannot be identified in the matching region setting process described later, the server 400 generates combined image data representing a combined image in which the two scanned images are joined together mechanically with the right edge of the left-side scanned image 20L abutting the left edge of the right-side scanned image 20R, for example (not shown).

In S45 of FIG. 2, the CPU 410 transmits the combined image data to the multifunction peripheral 200. Upon receiving the combined image data, the CPU 210 of the multifunction peripheral 200 stores this data in the nonvolatile storage device 230 and notifies the user that the data has been received. The combined image data is made available to the user for arbitrary purposes. For example, the multifunction peripheral 200 may print the combined image 50 on paper using the combined image data in response to a user command.

The image processing system 1000 having the configuration described above can generate combined image data representing a single original 10 using a plurality of sets of image data acquired by reading separate regions of a single original 10, such as that shown in FIG. 3, i.e., using left-side and right-side scan data sets.

Next, the matching region setting process in S35 of FIG. 2 will be described with reference to the flowchart in FIG. 7. In S110 the CPU 410 determines whether a first variance condition is met. FIG. 8 is a schematic diagram illustrating how the CPU 410 determines whether the first variance condition is met. The left part of FIG. 8 shows the left-side scanned image 20L, and a search region SA1 in the left-side scanned image 20L. The drawing also indicates an X-axis whose arrow is pointing in the right direction, and a Y-axis whose arrow is pointing in the downward direction. The X-axis extends in a horizontal direction that is orthogonal to a right edge Sr of the left-side scanned image 20L, and the Y-axis extends in a vertical direction parallel to the right edge Sr of the left-side scanned image 20L. Hereinafter, the direction along the X-axis will be called the X-direction, and the direction along the Y-axis will be called the Y-direction.

In the embodiment, the CPU 410 uses the image in the search region SA1 to determine whether the first variance condition is met. The search region SA1 in the embodiment is the initial region set as the search region used to search for the matching region CP and is a predetermined region in the left-side scanned image 20L (hereinafter called the "initial search region SA1"). The initial search region SA1 in the embodiment is a rectangular region along the right edge Sr of the left-side scanned image 20L whose width in the direction orthogonal to the right edge Sr of the left-side scanned image 20L is a prescribed width W1. Of the four edges forming the contours of the rectangular left-side scanned image 20L, the right edge Sr is the edge that is joined with the right-side scanned image 20R (hereinafter called the "joining edge Sr"). As shown in FIG. 5(A), the initial search region SA1 is configured to include at least part of the center image CIL representing the horizontal center portion CA of the original 10 (see FIG. 3).

A process region PA is indicated on the right side of FIG. 8. The CPU 410 uses the process region PA to search the initial search region SA1 for variable regions described later. The process region PA is a rectangular region having a width in the X-direction equivalent to the width W1 in the X-direction of the initial search region SA1 and a length in the Y-direction equivalent to the length of the reference region RA1 in the Y-direction (see FIG. 5(B)). By using this process region PA, the CPU 410 can suitably search for variable regions without excessively increasing the process time. The CPU 410 basically moves the position of the process region PA one pixel at a time from the top edge of the initial search region SA1 to the bottom edge so that the process region PA does not protrude out from the initial search region SAL The CPU 410 analyzes the image in the process region PA at each position and calculates a ratio of the number of variable pixels in the process region PA to the total number of pixels in the process region PA.

FIG. 9 is an explanatory diagram describing variable pixels and non-variable pixels. The CPU 410 selects one of the plurality of pixels in the process region PA to be a target pixel TP and calculates a variance V of the target pixel TP using pixels in a 3×3 region FL centered on the target pixel TP. First, as indicated in the equations in FIG. 9, the CPU 410 calculates a difference ΔVn between the RGB values of the target pixel TP (R0, G0, B0) and the RGB values for each of the eight surrounding pixels (Rn, Gn, Bn) surrounding the target pixel TP. Here, "n" is a number between 1 and 8 identifying the peripheral pixel of the target pixel TP, as is indicated for each pixel in the 3×3 region FL of FIG. 9. That is, the difference ΔVn is a sum of an absolute values of Rn−R0, Gn−G0, and Bn−B0. As shown in the equations of FIG. 9, the CPU 410 finds the variance V of the target pixel TP by taking the sum of differences ΔVn calculated for all eight peripheral pixels. The target pixel TP is classified as a variable pixel when the variance V of the target pixel TP is greater than or equal to a prescribed threshold Vth and is classified as a non-variable pixel when the variance V of the target pixel TP is less than the threshold Vth.

The CPU 410 repeatedly moves the process region PA within the initial search region SA1 on a pixel to pixel basis and calculates, at each position, the ratio of the number of variable pixels to the total number of pixels in the process region PA (hereinafter called the "variable pixel ratio") until the variable pixel ratio is greater than a prescribed threshold THx (50%, for example). When the variable pixel ratio for the image in the process region PA is greater than the threshold THx, the CPU 410 determines that the process region PA is a variable region. Variable regions in the initial search region SA1 have been shaded in the example of FIG. 8. If the process region PA is determined to be in a variable region, the CPU 410 moves the process region PA in the Y-direction to the position adjacent to the currently determined variable region and again searches for a new variable region while advancing the process region PA pixel by pixel in the Y-direction. In this way, the CPU 410 searches for variable regions throughout the entire initial search region SAL Note that the length of the process region PA in the Y-direction is shorter than the length of the initial search region SA1 in the Y-direction. In this way, the CPU 410 can more appropriately search for variable regions in the initial search region SA1 using a process region PA that is smaller than the initial search region SA1.

When the ratio of the number of pixels in variable regions to the number of pixels in the initial search region SA1 (hereinafter called the "variable region ratio") is less than a prescribed first reference ratio (50%, for example), the CPU 410 determines that the first variance condition is not met. The first variance condition not being met signifies that the image in the initial search region SA1 has little change in the color, shape, and the like of objects in the image. Thus, there is a good possibility that there exist regions in the left-side scanned image 20L that are other than the region representing the specific partial region image SPT (see FIG. 3) and that represent an image similar to the image in the reference region RAL However, if the variable region ratio is greater than or equal to the first reference ratio, the CPU 410 determines that the first variance condition is met. The first variance condition being met signifies that the image in the initial search region SA1 has many changes in the color, shape, and the like of objects in the image. In this case, there is little possibility that there exists a region in the left-side scanned image 20L that is other than the region representing the specific partial region image SPT and that expresses an image similar to the image in the reference region RA1. The results of the determination for the first variance condition are used in S150 described later. Note that the following description will assume that the first variance condition was satisfied when processing the left-side scanned image 20L in FIGS. 5(A) and 8. Further, the region used for determining the first variance condition in the example of FIG. 8 is the initial search region SAL In S120 of FIG. 7 the CPU 410 selects a candidate region from the initial search region SA1 (see FIG. 5(A)). FIGS. 10(A)-10(D) illustrate candidate regions that can be selected from the initial search region SAL The size and shape of the candidate region are set on the basis of the reference region RA1 (see FIG. 5(B)). First, the CPU 410 arranges a border NP having the same size and shape as the reference region RA1 over the initial search region SA1 so as to overlap at least part of the same. The portion inside the border NP that overlaps the initial search region SA1 is identified as the candidate region.

Figure 10:
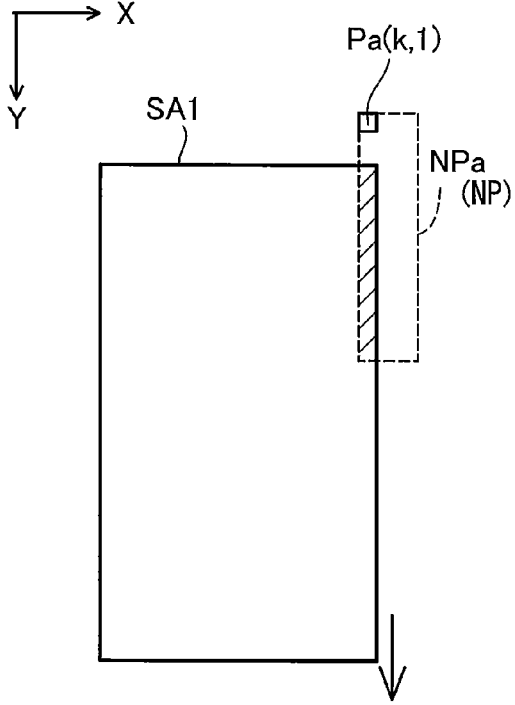
FIGS. 10(A)-10(D) are explanatory diagrams illustrating candidate regions selected from an initial search region.
Figure 10:
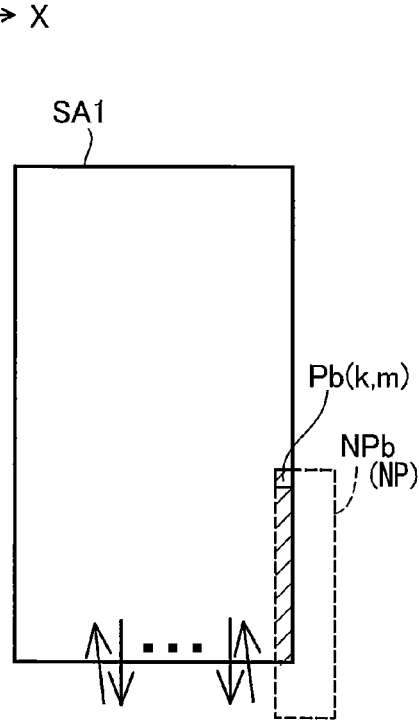
Figure 10:
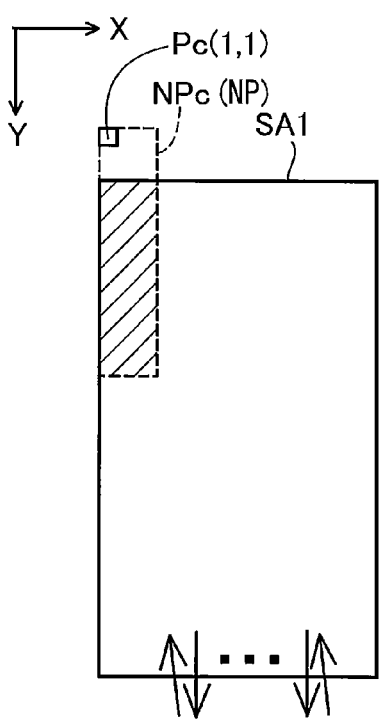
Figure 10:
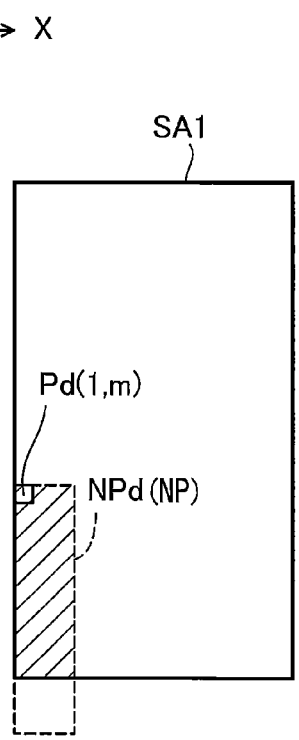

FIG. 10(A) shows, as an example of the border NP, a border NPa arranged over the uppermost and rightmost portion of the initial search region SA1. A pixel Pa in the upper-left corner of the border NPa has coordinate values (k, 1). The coordinate values (k, 1) for the pixel Pa are used merely for the convenience of describing the matching region setting process. Coordinate values for pixels Pb-Pd described below are used for the same purpose. The horizontal position (position along the X-axis) of the pixel Pa is equivalent to the horizontal position of the pixels on the right edge of the initial search region SA1. The vertical position (position along the Y-axis) of the pixel Pa is a prescribed distance (a length equivalent to 50-100 pixels, for example) above the pixels on the top edge of the initial search region SAL As indicated by hatching lines in FIG. 10(A), only a partial region in the border NPa corresponding to the lower plurality of pixels positioned along the left edge thereof overlaps the initial search region SA1. That is, the lower plurality of pixels is included in one vertical line having a width of one pixel along the left edge of the border NPa.

FIG. 10(B) shows, as an example of border NP, a border NPb arranged on the rightmost and bottommost portion of the initial search region SA1. A pixel Pb in the upper-left corner of the border NPb has the coordinate values (k, m). The horizontal position of the pixel Pb is equivalent to the horizontal position of the pixels on the right edge of the initial search region SA1, while the vertical position of the pixel Pb is a prescribed length above the pixels on the bottom edge of the initial search region SA1. Therefore, as indicated by hatching lines in FIG. 10(B), only a partial region of the border NPb corresponding to the upper plurality of pixels positioned on the left edge thereof overlaps the initial search region SA1. That is, the upper plurality of pixels is included in one vertical line having a width of one pixel along the left edge of the border NPb.

FIG. 10(C) shows, as an example of border NP, a border NPc arranged in the leftmost and uppermost portion of the initial search region SA1. A pixel Pc in the upper-left corner of the border NPc has the coordinate values (1, 1). The horizontal position of the pixel Pc is equivalent to the horizontal position of the pixels on the left edge of the initial search region SA1, and the vertical position of the pixel Pc is a prescribed length above the pixels on the top edge of the initial search region SA1. Therefore, as indicated by hatching lines in FIG. 10(C), only a partial region in the lower portion of the border NPc overlaps the initial search region SA1.

FIG. 10(D) shows, as an example of border NP, a border NPd arranged over the leftmost and lowermost portion of the initial search region SA1. A pixel Pd in the upper-left corner of the border NPd has the coordinate values (1, m). The horizontal position of the pixel Pd is equivalent to the horizontal position of pixels on the left edge of the initial search region SA1, while the vertical position of the pixel Pd is a prescribed length above pixels on the bottom edge of the initial search region SA1. Therefore, as indicated by hatching lines in FIG. 10(D), only a partial region in the upper portion of the border NPc overlaps the initial search region SA1.

The coordinate values of the upper-left pixel in the border NP used to identify the candidate region are selected sequentially from (k×m) coordinate positions expressed by (p, q), where p is any integer from 1 to k and q is any integer from 1 to m. Therefore, a total of (k×m) borders NP can be arranged over the initial search region SA1; i.e., a total of (k×m) candidate regions can be identified in the initial search region SA1.

As will be described later, a plurality of candidate regions can be selected from the initial search region SA1. Arrows in FIGS. 10(A) through 10(C) illustrate the order for selecting the (k×m) candidate regions in the initial search region SA1. The border NPa (see FIG. 10(A)) in the upper-right corner of the initial search region SA1 is the first of the (k×m) borders NP to be selected. Thereafter, borders NP are selected by sequentially shifting the position of the border NP downward one pixel at a time. After the border NPb (see FIG. 10(B)) in the lower-right corner has been selected, a border NP shifted one pixel leftward from the position of the border NPa is selected next. Thereafter, the borders NP are selected by again sequentially shifting the position of the border NP downward one pixel at a time. The last selected border NP is the border NPd (see FIG. 10(D)) in the lower-left corner of the initial search region SA1.

In the embodiment, the CPU 410 selects candidate regions beginning from the right edge of the initial search region SA1, i.e., from a position near the joining edge Sr of the left-side scanned image 20L (see FIG. 5(A)) that is joined to the right-side scanned image 20R and progressing to positions farther away from the joining edge Sr.

In S120 of FIG. 7, the CPU 410 selects one candidate region as a process target (hereinafter called the "target candidate region"). In S130 the CPU 410 calculates a similarity between the target candidate region and the reference region RA1. In the embodiment, the similarity is the ratio of the number SC of similar pixels to the total number Nt of pixels in the target candidate region (SC/Nt). Here, a similar pixel in the target candidate region is a pixel having a small difference ΔVP in pixel values to the corresponding pixel in the reference region RA1. The corresponding pixel in the reference region RA1 corresponds to the target pixel in the target candidate region. Specifically, the corresponding pixel is the pixel aligned with (overlapped with) the target pixel when the image in the target candidate region is superimposed over the image in the reference region RA1 such that the border NP used to identify the target candidate region is aligned with the outer edges of the reference region RA1. The difference ΔVP between the two pixels (the target pixel and the corresponding pixel) is expressed as the sum of absolute values of the differences between their three component values. Thus, if the RGB component values of the two pixels are respectively represented as (R1, G1, B1) and (R2, G2, B2), then the difference ΔVP is the sum of the absolute value of (R1−R2), the absolute value of (G1−G2), and the absolute value of (B1−B2). A similar pixel is a pixel whose difference ΔVP is smaller than or equal to a prescribed threshold TH1. The greater the similarity (SC/Nt) calculated above, the more similar the target candidate region to the reference region RA1.

In S140 the CPU 410 determines whether the similarity (SC/Nt) is greater than or equal to a prescribed threshold TH2. A similarity that is greater than or equal to the threshold TH2 indicates that the target candidate region is similar to the reference region RA1.

If the similarity is less than the threshold TH2 (S140: NO), i.e., when the target candidate region is not similar to the reference region RA1, in S170 the CPU 410 determines whether the above process has been completed for all candidate regions in the search region. If there remain unprocessed candidate regions (S170: NO), in S180 the CPU 410 selects a new (another, or next) target candidate region that has not been selected from the search region. The CPU 410 then returns to S130 and executes the same process on the new target candidate region.

However, if the similarity is greater than or equal to the threshold TH2 (S140: YES), in S145 the CPU 410 stores data identifying the target candidate region in a storage device, such as the volatile storage device 420 or the nonvolatile storage device 430, as data for identifying a candidate region similar to the reference region RA1 (hereinafter called a "similar candidate region"). Data identifying the similar candidate region (hereinafter called "similar candidate region data") may be data representing the position of the pixel in the upper-left corner of the border defining the candidate region, and the horizontal and vertical dimensions of the border defining the candidate region. In S145, the CPU 145 stores the similarity of the current similar candidate region in association with the data identifying the similar candidate region in the storage device 420 or 430.

In S150 the CPU 410 confirms whether the first variance condition was met in S110. If the first variance condition was met (S150: YES), in S200 the CPU 410 sets the similar candidate region that was stored in S145 as a matching region corresponding to the reference region RA1. In the example of FIG. 5(A), the matching region CP is set as the matching region corresponding to the reference region RA1. In S210 the CPU 410 sets a joining flag to "on" and subsequently ends the process of FIG. 7. When the joining flag is "on," in S40 of FIG. 2 the CPU 410 joins the right original image HIR to the left original image HIL such that the reference region RA1 is aligned with the matching region CP, as described in FIG. 6.

In this way, the CPU 410 searches the initial search region SA1 for at least one similar candidate region that resembles the reference region RA1. When the first variance condition is met, the CPU 410 selects candidate regions one after another and calculates the similarity for each candidate region until a single similar candidate region is found. In this case, the similar candidate region that is firstly found is set as the matching region CP corresponding to the reference region RA1. As described above, the image in the initial search region SA1 has many variations in the color and shape of its objects when the first variance condition is met. Therefore, there is a high probability that the similar candidate region firstly found will represent the specific partial region image SPT (see FIG. 3). Accordingly, by using the first similar candidate region firstly found as the matching region CP, the CPU 410 can generate combined image data representing a suitable combined image 30 (see FIG. 6).

Figure 11:
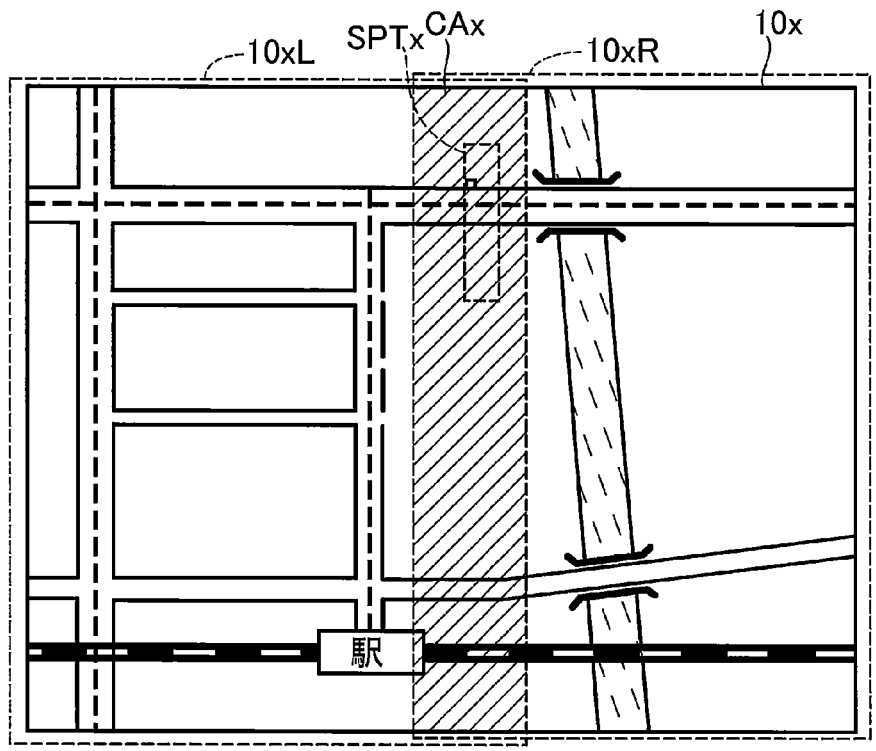
FIG. 11 is an explanatory diagram showing an example of an original in which the first variance condition is not met.
Figure 12A:
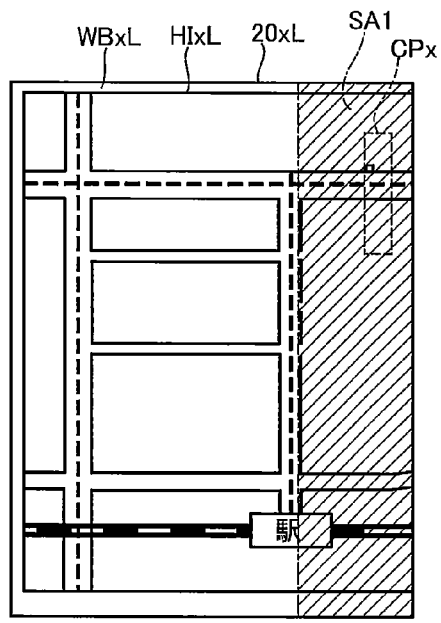
FIGS. 12(A) and 12(B) are explanatory diagrams respectively showing an example of a left-side scanned image and an example of a right side scanned image.
Figure 12B:
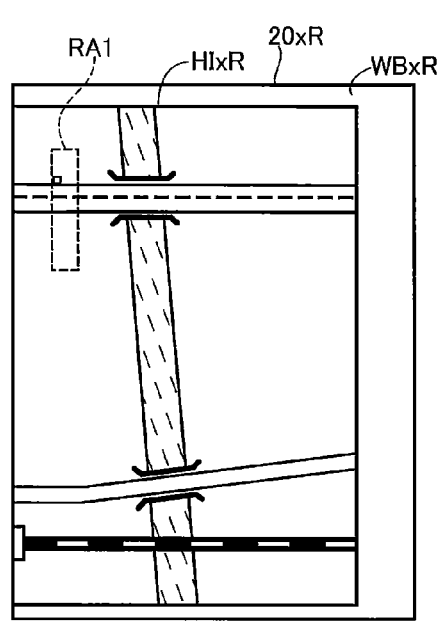

Next, a case in which the first variance condition is not met will be described. FIG. 11 shows a sample original in which the first variance condition is not met. An original 10x shown in FIG. 11 differs from the original 10 in FIG. 3 in that the image in a center portion CAx has little variation in the color, shape, and the like of its objects. The remaining configuration of the original 10x is identical to that of the original 10 in FIG. 3. FIGS. 12(A) and 12(B) show examples of scanned images. FIG. 12(A) shows a left-side scanned image 20xL represented by left-side scan data. The left-side scanned image 20xL includes a left-side original image HIxL representing a left-side region 10xL constituting the approximate left half of the original 10x in FIG. 11, and a white border WBxL. FIG. 12(B) shows a right-side scanned image 20xR represented by right-side scan data. The right-side scanned image 20xR includes a right-side original image HIxR representing a right-side region 10xR constituting the approximate right half of the original 10x in FIG. 11, and a white border WBxR. The reference region RA1 in the right-side scanned image 20xR is a predetermined region and is a region defined similarly to the reference region RA1 in FIG. 5(B). That is, the reference region RA1 in the right-side scanned image 20xR has a same size and shape of the reference region RA1 in FIG. 5(B) and is positioned at the the same as the reference region RA1 in FIG. 5(B). The specific partial image SPTx in the original 10x of FIG. 11 represents an image similar to the image in the reference region RA1 of the right-side scanned image 20xR shown in FIG. 12(B).

Figure 13:
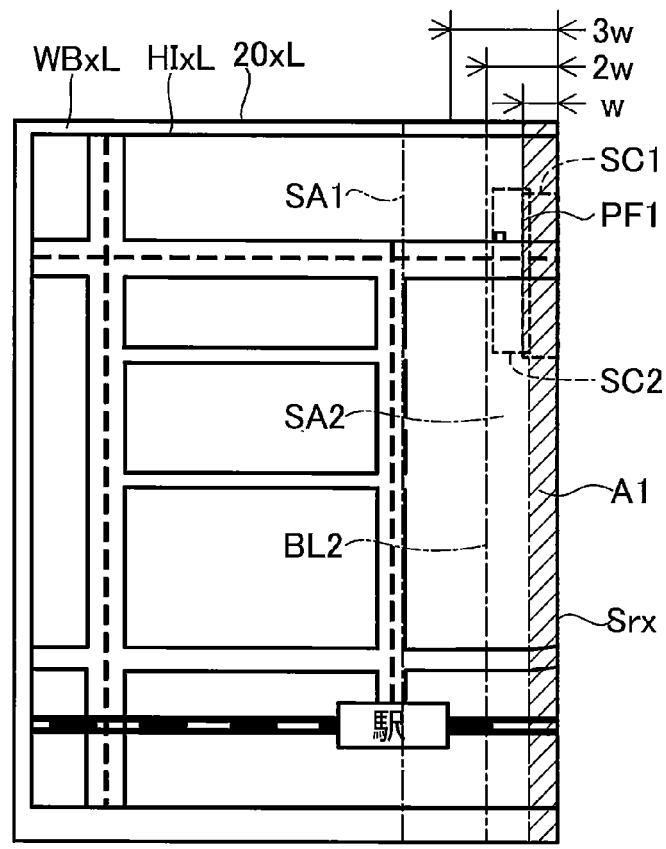
FIG. 13 is an explanatory diagram showing an example of a candidate region.

FIG. 13 is an explanatory diagram showing an example of a candidate region selected from the left-side scanned image 20xL. Here, a first candidate region SC1 will be described as the similar candidate region to be firstly found. While this firstly found candidate region SC1 does not represent the specific partial image SPTx in FIG. 11, the similarity of the first candidate region SC1 is greater than or equal to the threshold TH2. Since the image in the center portion CAx has little variation in the color, shape, and the like of its objects when the first variance condition is not met, it is possible for a region other than the region representing the specific partial image SPTx (a region near the specific partial image SPTx, for example) to to be greater than or equal to the threshold TH2.

Figure 7:
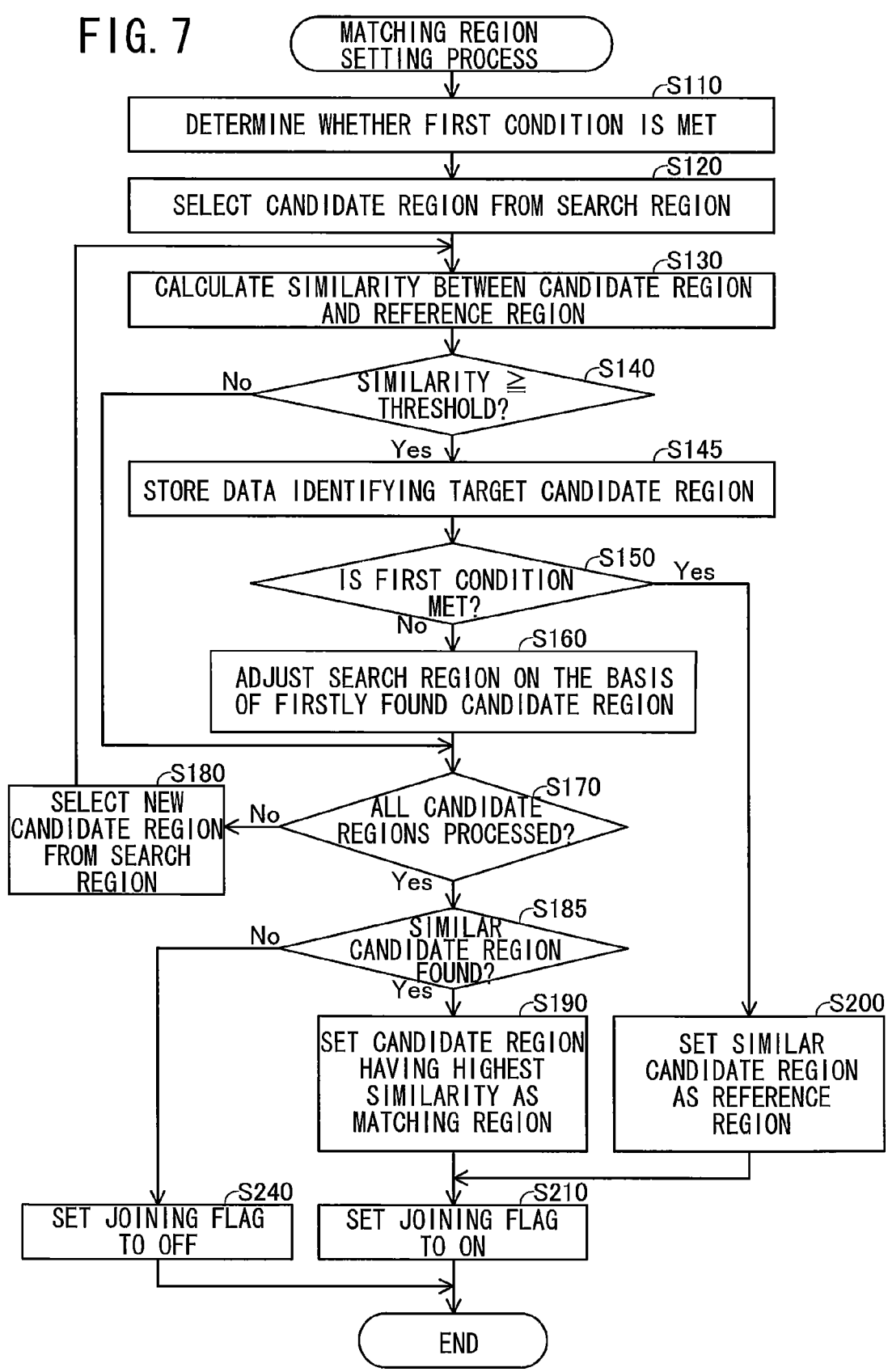
FIG. 7 is a flowchart illustrating a matching region setting process.
Figures 8, 9:
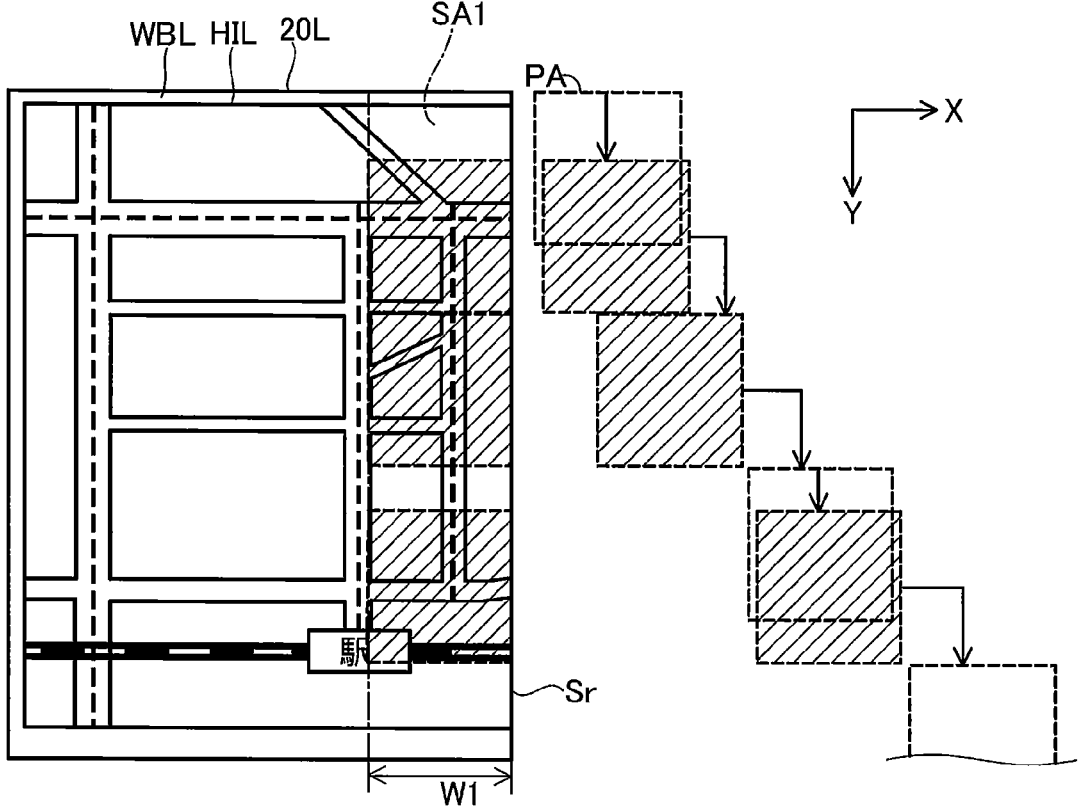
FIG. 8 is a schematic diagram illustrating how a CPU determine whether a first variance condition is met.
FIG. 9 is an explanatory diagram illustrating variable pixels and non-variable pixels.

When the first candidate region SC1 is the target candidate region, in S140 of FIG. 7 the CPU 410 determines that the similarity for the first candidate region SC1 is greater than or equal to the threshold TH2. Hence, in S145 the CPU 410 stores data identifying this target candidate region (the first candidate region SC1 in this case) in the storage device as similar candidate region data in association with its similarity and in S150 confirms that the first variance condition was not met. In S160 the CPU 410 adjusts (modifies) the search region on the basis of the similar candidate region that was firstly found.

FIG. 13 shows the initial search region SA1, and an adjusted search region SA2. The adjusted search region SA2 is the region resulting from adjusting the initial search region SA1 in S160 of FIG. 7 on the basis of the firstly found candidate region SC1. An edge Srx in FIG. 13 is one of four edges forming the rectangular contour of the left-side scanned image 20xL that is joined to the right-side scanned image 20xR (hereinafter called the "joining edge Srx"). The shaded region A1 includes the firstly found candidate region SC1 and the image region from which candidate regions have already been selected prior to the firstly found candidate region SC1 being selected as the target candidate region (hereinafter called the "processed region A1"). A portion PF1 of the processed region A1 denotes the portion farthest from the joining edge Srx among portions in the processed region A1 (hereinafter called the "farthest portion PF1"). In the embodiment, the farthest portion PF1 includes the left edge of the first candidate region SC1. The distance between the farthest portion PF1 and the joining edge Srx in the processed region A1 will be called a distance w. The majority of the region whose distance from the joining edge Srx is within the distance w constitutes the processed region A1 (hereinafter, the distance w will be called the "processed distance w"). Distances in the left-side scanned image 20xL may be expressed in pixel numbers, for example.

As described with reference to FIGS. 10(A)-10(D), the CPU 410 selects candidate regions beginning from the position closest to the joining edge Srx and progresses to positions farther away from the joining edge Srx. Further, the CPU 410 uses the region interposed between the joining edge Srx and a line BL2 separated from the joining edge Srx by a distance of two times the processed distance w as the adjusted search region SA2. The line BL2 is a parallel line to the joining edge Srx. A region representing the specific partial image SPTx (FIG. 11) is predicted to exist near the similar candidate region that was firstly found (the first candidate region SC1 in this case). Therefore, it is likely that a region representing the specific partial image SPTx can be found by employing a range of approximately two times the processed distance w as a new search region. Note that the adjusted search region SA2 can be smaller than the initial search region SA1, as in the example of FIG. 13. However, the adjusted search region SA2 may in some cases be larger than the initial search region SA1. Hereafter, the adjusted search region SA2 is used as the search region. Note that S160 of FIG. 7 is executed only once when a similar candidate region is firstly found.

In S170 of FIG. 7, the CPU 410 determines whether the above process has been performed for all candidate regions in the search region (the adjusted search region SA2 in this case). If there remain unprocessed candidate regions (S170: NO), in S180 the CPU 410 selects a new (next) target candidate region from the search region. The CPU 410 selects this new target candidate region according to the same procedure described with reference to FIGS. 10(A)-10(D). Next, the CPU 410 returns to S130 and executes the above process on the new target candidate region. In the example of FIG. 13, the adjusted search region SA2 includes, in addition to the first candidate region SC1, a second candidate region SC2 that is a similar candidate region representing the specific partial image SPTx of FIG. 11.

If the above process has been completed for all candidate regions in the search region (the adjusted search region SA2; S170: YES), in S185 the CPU 410 references the similar candidate region data in the storage device to determine whether at least one similar candidate region was found. If at least one similar candidate region was found (S185: YES), in S190 the CPU 410 sets, as a matching region CPx, the candidate region having the highest similarity among one or more similar candidate regions that were found. In the example of FIG. 13, the second candidate region SC2 has a higher similarity than the first candidate region SC1. Thus, the second candidate region SC2 is set as the matching region CPx. In S210 the CPU 410 sets the joining flag to "on" and ends the process in FIG. 7. In S40 of FIG. 2, the CPU 410 generates combined image data representing a combined image (not shown) in which the right-side original image HIxR in the right-side scanned image 20xR is joined with the left-side original image HIxL in the left-side scanned image 20xL such that the reference region RA1 is arranged in the same position as the matching region CPx.

Thus, when the first variance condition is not met, as in this case, the CPU 410 searches the adjusted search region SA2 for similar candidate regions having a similarity greater than or equal to the prescribed threshold TH2 (normally a plurality of similar candidate regions is found). In the example of FIG. 13, the first candidate region SC1 and the second candidate region SC2 are identified as similar candidate regions. The CPU 410 then sets the candidate region that has the greatest similarity among the plurality of candidate regions having a similarity greater than or equal to the threshold TH2 as the matching region (the second candidate region SC2 is set as the matching region CPx in the example of FIG. 13). This enables the CPU 410 to prevent a drop in precision for setting the joining positions of the left-side original image HIxL and the right-side original image HIxR.

Further, when the first variance condition is not met, as described in FIG. 13, the CPU 410 modifies the search region (to the adjusted search region SA2 in this example) so that the search distance, i.e., the distance between the joining edge Srx and the portion in the search region farthest from the joining edge Srx, is twice the processed distance w. By using an adjusted search region SA2 that is suited to the left-side scanned image 20xL in this way, the CPU 410 can suppress a drop in precision for setting the joining positions of the left-side original image HIxL and the right-side original image HIxR.

Further, when the first variance condition is satisfied, the CPU 410 sets the similar candidate region that was firstly found as the matching region CP corresponding to the reference region RA1, as described in S200 of FIG. 7. In other words, the CPU 410 uses a candidate region having a similarity greater than or equal to the prescribed threshold TH2 as the matching region CP. However, if the first variance condition is not met, the CPU 410 sets one of the plurality of similar candidate regions having the highest similarity as the matching region CPx, as described in S190 of FIG. 7. Therefore, the similarity of the candidate region set as the matching region CPx is at least as high as the lowest similarity among the plurality of similar candidate regions (hereinafter called the "lowest candidate similarity"). In other words, the CPU 410 uses a candidate region having a similarity at least equal to the lowest candidate similarity (normally higher than the prescribed threshold TH2) as the matching region CPx. Thus, the effective standard of similarity differs between cases in which the first variance condition is met and cases in which the first variance condition is not met. Accordingly, the CPU 410 can suppress a drop in the precision of setting the joining position for the left-side original image and the right-side original image when processing various types of images.

Note that if a similar candidate region was not found (S185: NO), in S240 the CPU 410 sets the joining flag to "off" and ends the process in FIG. 7. When the joining flag is "off," in S240 of FIG. 2 the CPU 410 executes a prescribed process for cases in which a matching region CP was not set, as described earlier.

B. Second Embodiment

Figure 14:
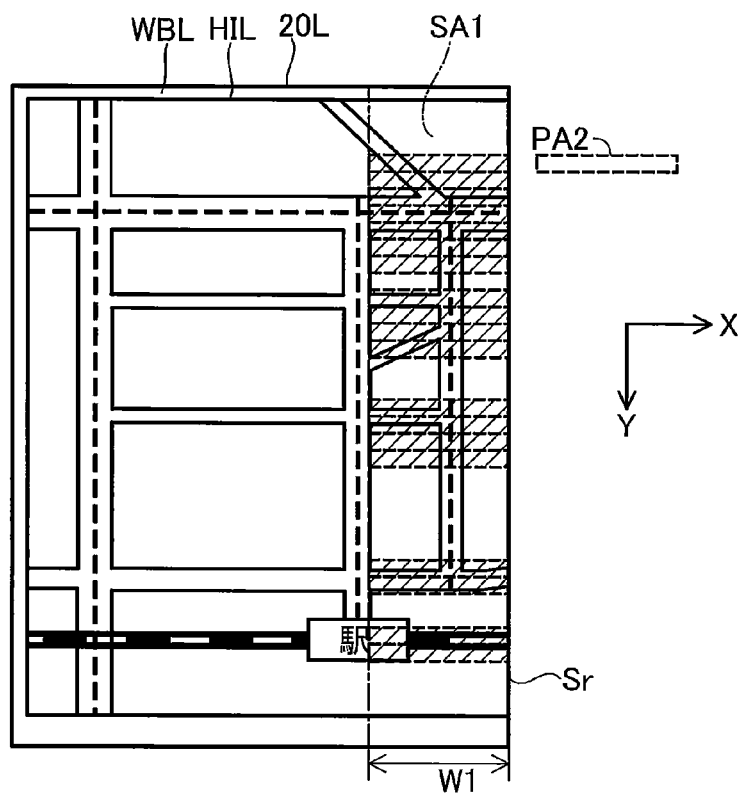
FIG. 14 is a schematic diagram illustrating a process for determining the first variance condition according to a second embodiment

FIG. 14 is a schematic diagram showing a second embodiment of the process for determining a first variance condition (S110 of FIG. 7). The process described in FIG. 14 differs from the determination process in FIG. 8 only in that the dimension of a process region PA2 in the Y-direction according to the second embodiment in FIG. 14 is equivalent to one pixel. The dimension of the process region PA2 in the X-direction is identical to the width W1 of the initial search region SA1. All processes other than the process for determining the first variance condition in the second embodiment are the same as the first embodiment described with reference to FIGS. 2 and 7. Further, the image-processing system used for image processing in the second embodiment is equivalent to the image-processing system 1000 shown in FIG. 1.

The process for determining the first variance condition according to the second embodiment is identical to the process in the first embodiment once the process region PA in the process of FIG. 8 is replaced with the process region PA2. That is, the CPU 410 moves the position of the process region PA2 one pixel at a time from the top edge of the initial search region SA1 to the bottom edge so that the process region PA2 does not protrude out from the initial search region SA1. The CPU 410 analyzes the image in the process region PA2 at each position and calculates the ratio of the number of variable pixels in the process region PA2 to the number of all pixels in the process region PA2. The CPU 410 determines that the first variance condition is not met when the variable region ratio (i.e., the ratio of the number of pixels in variable regions to the number of pixels in the initial search region SA1) is less than the first reference ratio (50%, for example) and determines that the first variance condition is met when the variable region ratio is greater than or equal to the first reference ratio.

In the second embodiment, the CPU 410 uses the process region PA2, which is smaller than the process region PA in FIG. 8 to identify variable regions. Therefore, the CPU 410 in the second embodiment can reliably determine whether the first variance condition is met. The process region may also be set to a region other than the process region PA in FIG. 8 and the process region PA2 in FIG. 14. For example, a region having the same size and shape as the reference region RA1 may be used as the process region. In this case, the process for determining the first variance condition may be implemented as follows. First, the CPU 410 moves the process region one pixel at a time, as with the border ND described in FIGS. 10(A)-10(D). Next, the CPU 410 analyzes the image in the process region at each position and calculates the ratio of the number variable pixels in the process region to the total number of pixels in the process region. The CPU 410 then identifies variable regions in the initial search region SA1 and determines whether the first variance condition is met.

C. Third Embodiment

Figure 15:
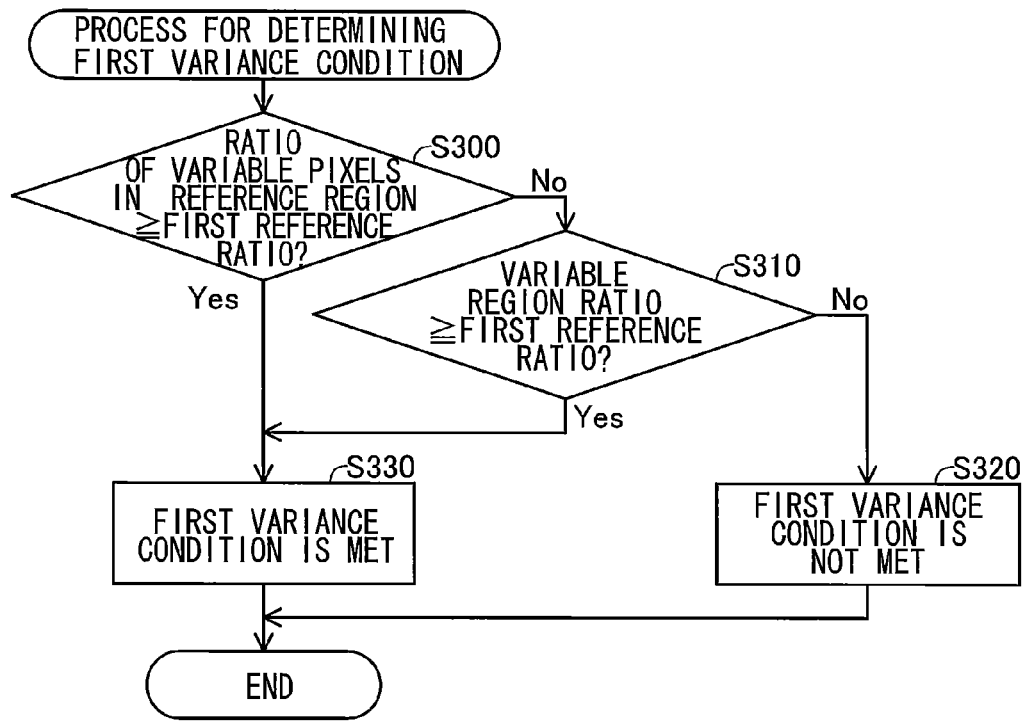
FIG. 15 is a flowchart illustrating a process for determining whether the first variance condition is met according to a third embodiment.

FIG. 15 is a flowchart illustrating steps in a process for determining whether the first variance condition is met (S110 of FIG. 7) according to a third embodiment. Unlike the determination process of FIG. 8, the determination process of FIG. 15 uses both the initial search region SA1 and the reference region RA1. Processes other than the process for determining whether the first variance condition is met are identical to the first embodiment described with reference to FIGS. 2 and 7. Further, the image-processing system used for image processing in the third embodiment is identical to the image-processing system 1000 shown in FIG. 1.

In S300 at the beginning of the determination process in FIG. 15, the CPU 410 analyzes the image in the reference region RA1 (see FIG. 5(B)) and calculates the ratio of the number of variable pixels in the reference region RA1 to all pixels in the reference region RA1. The method of identifying variable pixels in the third embodiment is the same as the method described with reference to FIG. 9. If the ratio of the number of variable pixels in the reference region RA1 is greater than or equal to the prescribed first reference ratio (50%, for example; S300: YES), in S330 the CPU 410 determines that the first variance condition is met and subsequently ends the process of FIG. 15.

However, if the ratio of the number of variable pixels in the reference region RA1 is less than the first reference ratio (S300: NO), in S310 the CPU 410 analyzes the image in the initial search region SA1 and calculates a variable region ratio of the initial search region SA1. The method of calculating the variable region ratio is the same as the calculation method in S110 of FIG. 7. If the variable region ratio is greater than or equal to the first reference ratio (S310: YES), in S330 the CPU 410 determines that the first variance condition is met and subsequently ends the process of FIG. 15.

However, if the ratio of the number of variable pixels in the reference region RA1 and the variable region ratio of the initial search region SA1 are both less than the first reference ratio (S300: NO, S310: NO), in S320 the CPU 410 determines that the first variance condition is not met and subsequently ends the process of FIG. 15.

As described above, in the process for determining the first variance condition according to the third embodiment, both the initial search region SA1 and the reference region RA1 are used as a determination region for determining whether the first variance condition is met. Accordingly, this process enables the CPU 410 to set a matching region suited to variations in pixel values in the initial search region SA1 and variations in pixel values in the reference region RA1, thereby suppressing a drop in precision in setting the joining positions of the left-side original image and the right-side original image. For example, if the ratio of the number of variable pixels in the reference region RA1 is greater than or equal to the first reference ratio, then the image in the reference region RA1 has many changes in the color, shape, and the like of its objects. Therefore, there is little chance that a region representing an image different from the reference region RA1 will be mistakenly set as the matching region. Hence, by determining whether the first variance condition is met, it is possible to suppress a drop in the precision of setting joining positions while reducing the process load. Further, when the variable region ratio of the initial search region SA1 is greater than or equal to the first reference ratio, the image in the initial search region SA1 has many changes in the color, shape, and the like of its objects. Therefore, there is little chance that a region representing an image other than the reference region RA1 will be mistakenly set as the matching region. Hence, by determining whether the first variance condition is met, it is possible to suppress a drop in precision in setting the joining positions while reducing the process load.

D. Fourth Embodiment

Figure 16:
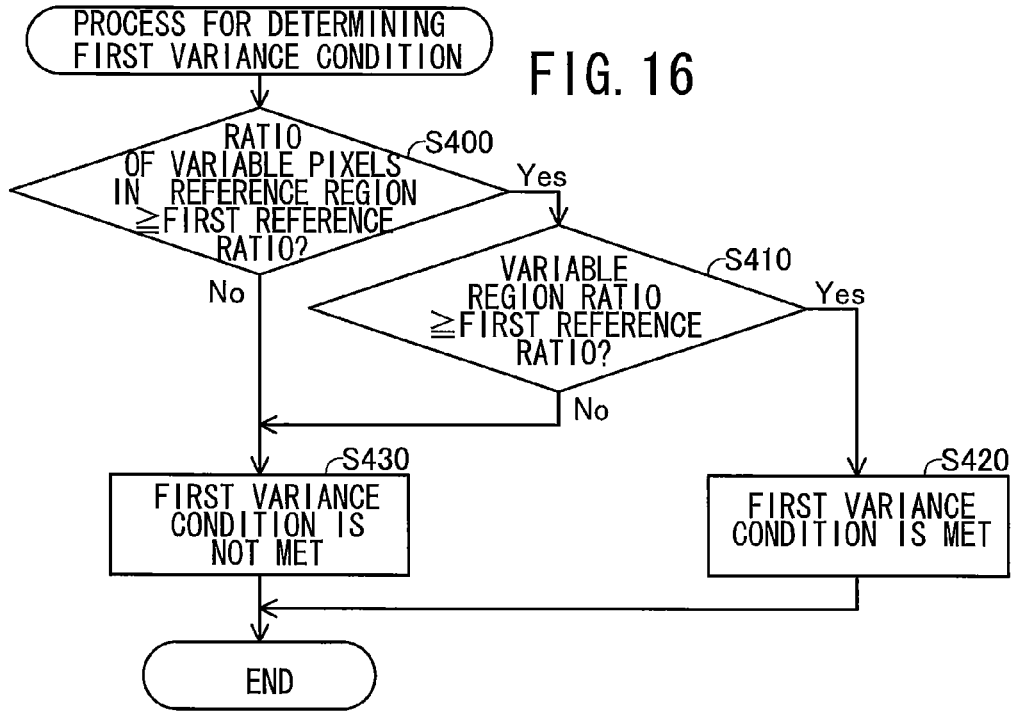
FIG. 16 is a flowchart illustrating a process for determining whether the first variance is met condition according to a fourth embodiment.

FIG. 16 is a flowchart illustrating steps in a process for determining the first variance condition (S110 of FIG. 7) according to a fourth embodiment. The determination process of FIG. 16 differs from the process of FIG. 15 only in combinations of the condition for the ratio of the number of variable pixels in the reference region RA1 and the condition for the variable region ratio of the initial search region SA1.

More specifically, in the process of FIG. 16 according to the fourth embodiment, the CPU 410 determines that the first variance condition is met when the ratio of the number of variable pixels in the reference region RA1 to the number of all pixels in the reference region RA1 is greater than or equal to the first reference ratio (S400: YES) and when the variable region ratio of the initial search region SA1 is greater than or equal to the first reference ratio (S410: YES), and subsequently ends the process of FIG. 16. However, if the ratio of the number of variable pixels in the reference region RA1 is less than the first reference ratio (S400: NO) or if the variable region ratio of the initial search region SA1 is less than the first reference ratio (S410: NO), in S430 the CPU 410 determines that the first variance condition is not met and subsequently ends the process of FIG. 16.

Thus, in the process for determining the first variance condition according to the fourth embodiment, the initial search region SA1 and the reference region RA1 are included as a determination region used for determining whether the first variance condition is met. Hence, by setting a matching region that is suited to variations in pixel values in the initial search region SA1 and variations in pixel values in the reference region RA1, the CPU 410 can suppress a drop in precision in setting the joining positions of the left-side original image and the right-side original image.

The embodiment described in FIG. 16 has a higher probability of determining that the first variance condition is not met than the embodiment described in FIG. 15. Therefore, there is a higher probability in the fourth embodiment of FIG. 16 that a plurality of similar candidate regions will be used for setting the matching region. Thus, the CPU 410 can suppress a drop in precision in setting the joining positions of the left-side original image and the right-side original image.

On the other hand, the embodiment in FIG. 15 has a higher probability of determining that the first variance condition is met than the embodiment of FIG. 16. Therefore, there is a higher probability in the third embodiment of FIG. 15 that the similar candidate region that is firstly found will be used as the matching region. Thus, the third embodiment can reduce process load.

E. Fifth Embodiment

FIG. 17(A) shows a part of a flowchart for the matching region setting process according to a fifth embodiment. FIG. 17(B) is a schematic diagram illustrating the process. Specifically, FIG. 17(A) shows a step S155 that has been added to the flowchart in FIG. 7. The addition of step S155 is the only difference from the matching region setting process of FIG. 7 according to the first embodiment. All steps in the matching region setting process according to the fifth embodiment excluding the addition step S155 are identical to those in the first embodiment of FIGS. 2 and 7. Further, the image-processing system used for image processing in the fifth embodiment is the same as the image-processing system 1000 in FIG. 1.

When the first variance condition was not met in S150 of FIG. 7 (S150: NO), in S155 of FIG. 17(A) the CPU 410 calculates the ratio of the number of variable pixels in the unprocessed region to the number of all pixels in the unprocessed region. FIG. 17(B) shows part of the left-side scanned image 20xL from FIG. 12(A). In this example, it will be assumed that the firstly found candidate region SC1 is the target candidate region, the similarity for the first candidate region SC1 is greater than or equal to the threshold TH2 (S140: YES), and the first variance condition was not met (S150: NO). The shaded region UPA in FIG. 17(B) is the area of the initial search region SA1 from which candidate regions have not yet been selected (hereinafter called the "unprocessed region UPA"). In S155 the CPU 410 analyzes the image in the unprocessed region UPA and calculates the ratio of the number variable pixels in the unprocessed region UPA to the number of all pixels in the unprocessed region UPA. Next, the CPU 410 determines whether a second variance condition is met. The second variance condition is met when the ratio of the number of variable pixels in the unprocessed region UPA is greater than or equal to a prescribed second reference ratio (50%, for example). If the second variance condition is not met for the unprocessed region UPA (S155: NO), the CPU 410 advances to S160 of FIG. 7. Subsequently, in S180 the CPU 410 selects a new candidate region from the unprocessed region UPA and executes the above process on the selected candidate region. However, when the second variance condition is met for the unprocessed region UPA (S155: YES), the CPU 410 does not select a new candidate region from the unprocessed region UPA, but rather in S190 of FIG. 7 sets the candidate region having the greatest similarity from among the one or more similar candidate regions found above as the matching region.

In the fifth embodiment described above, the CPU 410 can add similar candidate regions from the unprocessed region UPA when the variance of pixel values in the unprocessed region UPA is less than the second reference ratio, thereby suppressing a drop in precision in setting the joining positions of the left-side original image and the right-side original image. Further, there is a high probability that a similar candidate region will not be found in the unprocessed region UPA when the variance of pixel values therein is greater than or equal to the second reference ratio. Therefore, the CPU 410 in the fifth embodiment does not select a new candidate region from the unprocessed region UPA, but sets the candidate region having the greatest similarity from among the one or more similar candidate regions that have been found thus far as the matching region. Accordingly, the CPU 410 of the fifth embodiment can suppress a drop in precision in setting the joining positions while reducing the process load. In the above explanation, the second reference ratio is 50%, that is, equal to the first reference ratio. However, the second reference ratio may be different from the first reference ratio.

Note that S155 in FIG. 17(A) may be executed after S160 of FIG. 7. In other words, the unprocessed area in an adjusted search region (the adjusted search region SA2 in FIG. 13, for example) may be used as the unprocessed region UPA.

F. Sixth Embodiment

Figure 18:
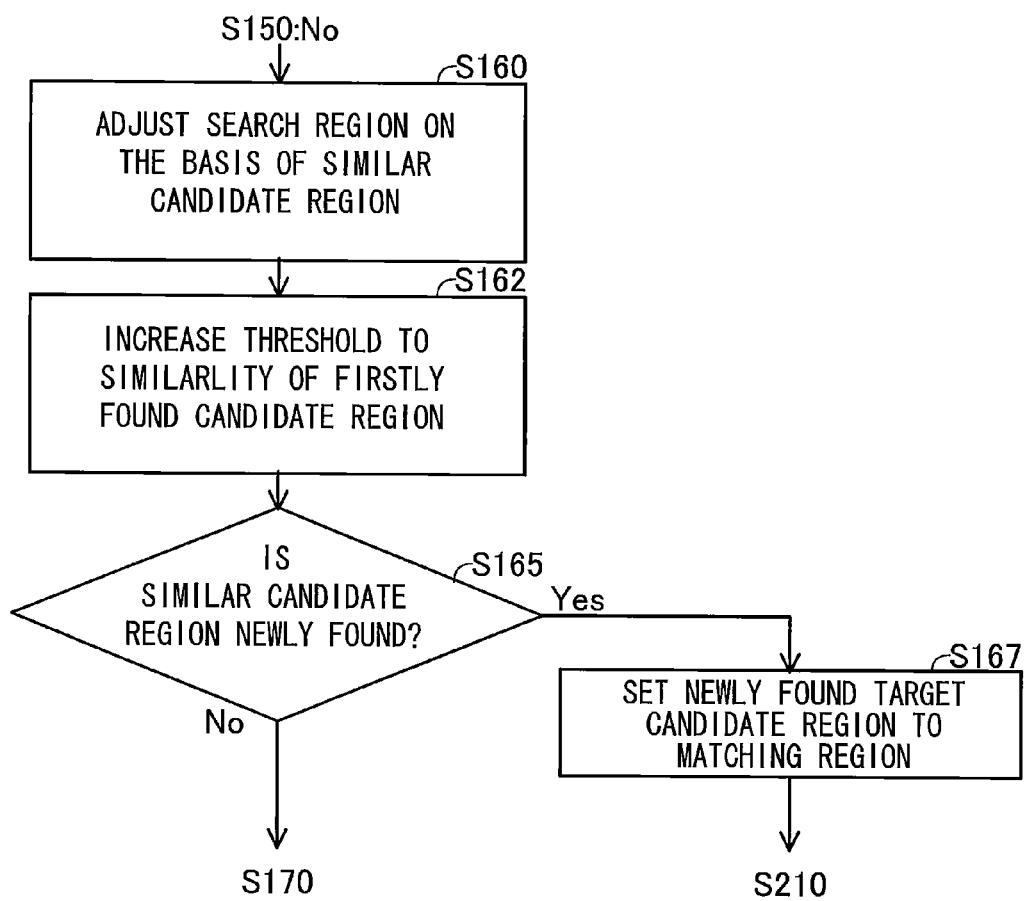
FIG. 18 is a part of a flowchart for a matching region setting process according to a sixth embodiment.

FIG. 18 shows a part of a flowchart for the matching region setting process according to a sixth embodiment. Here, steps S162, S165, and S167 have been added to the flowchart in FIG. 7. The addition of these steps is the only difference from the matching region setting process in the first embodiment. All steps in the matching region setting process in the sixth embodiment, excluding steps S162, S165, and S167, are the same as described in the first embodiment. Further, the image-processing system used for image processing in the sixth embodiment is the same as the image-processing system 1000 shown in FIG. 1.

When the first variance condition was not met in S150 of FIG. 7 (S150: NO), in S160 the CPU 410 adjusts the search region on the basis of the similar candidate region that was firstly found, and in S162 increases the threshold for similarity from the prescribed threshold TH2 to the similarity of the similar candidate region that was firstly found. For example, if the firstly found candidate region SC1 in the left-side scanned image 20xL of FIG. 13 is the similar candidate region that is firstly found in the above process, in S162 the CPU 410 increases the threshold for similarity to the similarity of the firstly found candidate region SC1. Consequently, the next time the CPU 410 executes step S140 of FIG. 7, the CPU 410 will use the increased threshold value in place of the threshold TH2 as the threshold for similarity. Note that steps S160 and S162 are executed only once after the similar candidate region has been firstly found. Further, S160 may be executed after S162.

In S165 the CPU 410 determines whether the similarity of the target candidate region is greater than the increased threshold. If the similarity of the target candidate region is less than or equal to the increased threshold (S165: NO), the process advances to S170. Note that the similarity of the target candidate region will not be greater than the increased threshold the first time the CPU 410 executes the process in S165 after executing step S162.

If the similarity of the target candidate region is greater than the increased threshold (S165:YES), the target candidate region is a similar candidate region having a higher similarity than the similarity of the similar candidate region that is firstly found above (hereinafter this target candidate region will be called the "high-similarity candidate region"). In the example of FIG. 13, the secondly-found candidate region SC2 of the left-side scanned image 20xL could be the high-similarity candidate region. If the target candidate region is the high-similarity candidate region, in S167 the CPU 410 sets the target candidate region (i.e., the high-similarity candidate region) as the matching region and advances to S210.

As described above, if the CPU 410 in the sixth embodiment finds a similar candidate region having a greater similarity than the threshold TH2 (the first candidate region SC1, for example), the CPU 410 continues to select another candidate region and to calculate the similarity of the selected candidate region until having found a high-similarity candidate region (the second candidate region SC2, for example) having a greater similarity than that of the similar candidate region that is firstly found. The CPU 410 sets the high-similarity candidate region as the matching region. Thus, the CPU 410 uses the high-similarity candidate region having a greater similarity than that of the similar candidate region that is firstly found as the matching region when the first variance condition is not satisfied, thereby suppressing a drop in the precision of setting the joining positions. Further, once the CPU 410 finds a single high-similarity candidate region in the embodiment of FIG. 18, the CPU 410 sets this region as the matching region, without selecting any more new candidate regions. By not selecting two or more high-similarity candidate regions, the CPU 410 can reduce process load.

G Variations of the Embodiments (1) The search distance of the adjusted search region may be set to a value other than two times the processed distance w described in the embodiment of FIG. 13. In order to set a suitable matching region, the CPU 410 may adjust the search region such that the search distance of the adjusted search region is greater than the processed distance w but less than or equal to three times the processed distance w.

(2) Other conditions may be used as the first variance condition in S110 and S150 of FIG. 7. For example, the CPU 410 may determine that the first variance condition is met when the ratio of the number of variable pixels in the reference region RA1 to the number of all pixels in the reference region is greater than or equal to the first reference ratio, regardless of the image in the initial search region SAL Further, another method may be used for distinguishing variable pixels from non-variable pixels. For example, the absolute value of a difference in brightness values may be used as the difference $\Delta Vn$. In this case, the brightness values may be calculated using a predetermined equation (for example, an equation that calculates the Y-component, i.e., the luminance component in the YCbCr color space, on the basis of the three RGB color components). In general, any of various conditions indicating that pixel values are highly variable may be used as the first variance condition. Further, at least part of a specified region including the search region and the reference region may be used as a determination region for determining the first variance condition. For example, part of the initial search region SA1 (half of the initial search region SA1 nearest the joining edge Sr, for example) may be employed as the determination region. Similarly, any of various conditions indicating that pixel values are highly variable may be used as the second variance condition in the embodiment described with reference to FIG. 17.

(3) The reference region RA1 may be a variable region rather than a predetermined region. For example, the CPU 410 may set the reference region on the basis of the results of analyzing the image in which the reference region is to be set (the right-side scanned image, for example). In this case, the size or shape of the reference region RA1 is changed on the basis of the analysis, for example.

(4) The initial search region may also be a variable region rather than a predetermined region. For example, the CPU 410 may set the initial search region on the basis of the results of analyzing the image in which the search region is to be set (the left-side scanned image, for example). In this case, the size or shape of the initial search region is changed on the basis of the analysis, for example.

(5) The reference value used to determine whether a candidate region is similar to the reference region (the threshold TH2, for example) may be a variable value rather than a predetermined value. For example, the CPU 410 may employ higher reference values of similarity for higher ratios of the number of variable pixels in the determination region used to determine the first variance condition.

(6) Another type of index representing the degree of similarity between a reference region and a candidate region may be used in place of the similarity index described in the embodiments. For example, the target pixel may be considered as a similar pixel when the absolute value of the difference in brightness values between the target pixel in the candidate region and a pixel in the reference region that corresponds to the target pixel is smaller than or equal to a prescribed reference value. Then, the ratio of the number of similar pixels to the total number Nt of pixels in the candidate region may be used to determine similarity.

(7) Other processes may be employed in place of the matching region setting process described in the embodiments. For example, S160 of FIG. 7 described in the embodiments may be omitted. Further, the reference ratios used in steps S300 and S310 of FIG. 15 may differ. Similarly, the reference ratios used in steps S400 and S410 of FIG. 16 may differ. Further, any of the embodiments described above with reference to FIGS. 14, 15, 16, 17, and 18 may be selectively combined (excluding a combination that includes both the third embodiment of FIG. 15 and the fourth embodiment of FIG. 16).

(8) If the two images represented by the two sets of scan data are referred to as the first image and the second image, respectively, the CPU 410 in the embodiments generates a combined image by joining the region along the left edge of the right-side scanned image 20R serving as the first image with the region along the right edge of the left-side scanned image 20L serving as the second image. Alternatively, the combined image may be generated by joining the region along the right edge of the first image with the image along the left edge of the second image according to the single original that was used to generate the two sets of scan data, for example, or by joining the region near the bottom edge of the first image with the region near the top edge of the second image or by joining the region near the top edge of the first image with the region near the bottom edge of the second image. As described above, there are four joining methods for joining the first image and the second image.

Thus, the joining method of joining the first and second images may be preselected. Alternatively, a matching region may be set for each of the four joining methods described above. That is, the CPU 41 searches four matching regions corresponding to the four joining method. In this case, the CPU 410 may generate combined image data representing a combined image in which the first and second images are joined together according to the joining method producing the highest similarity between the reference region and the matching region.

Here, the reference region and the initial search region are preferably different for each of the four joining methods described above. When joining the region near the bottom edge of the first image to the region near the top edge of the second image, for example, the reference region may be arranged near the bottom edge of the first image and the search region may be arranged near the top edge of the second image. In general, the reference region is preferably arranged in the joining portion of one image while the search region is preferably arranged in the joining portion of the other image.

(9) In the embodiments described above, the two sets of scan data used to generate the combined image data include right-side scan data and left-side scan data obtained by reading a single original 10. However, the two sets of scan data may be acquired by reading two separate originals.

(10) In the embodiments described above, two sets of scan data generated from an original read by the scanning unit 250 of the multifunction peripheral 200 are the two sets of image data used for producing combined image data. However, a digital camera may generate these two sets of image data by capturing images for a plurality of regions of an original.

(11) In the embodiments, two sets of image data are used to generate combined image data representing a combined image in which two images are joined together, but combined image data may be generated using any number of sets of image data. For example, four sets of image data may be used to generate combined image data representing a combined image that is formed by joining four images together.

(12) The processes executed by the CPU 410 of the server 400 in the embodiments described above (for examples, processes in S25-S40 of FIG. 2) may be executed by the CPU 210 of the multifunction peripheral 200 instead. In this case, the server 400 is not needed, and the multifunction peripheral 200 may execute the processes in FIG. 2 alone. Further, the processes executed by the CPU 410 of the server 400 may be executed by a CPU (not shown) in the personal computer 500 (see FIG. 1) connected to the multifunction peripheral 200. The CPU of the personal computer 500 may perform these processes by executing a scanner driver program installed on the personal computer 500, for example. Further, the server 400 may be configured of a single computer, as in the embodiments, or may be configured of a computer system including a plurality of computers.

(13) Part of the configuration implemented in hardware in the embodiments described above may be replaced with software and, conversely, all or part of the configuration implemented in software in the embodiments may be replaced with hardware.

When all or part of the functions in the present disclosure are implemented by computer programs, the programs can be stored on a computer-readable storage medium (a non-temporary storage medium, for example). The programs may be used from the same storage medium on which they are provided (an example of a computer-readable storage medium), or may be first loaded onto a different storage medium (an example of a computer-readable storage medium). The "computer-readable storage medium" may be a portable medium, such as a memory card or CD-ROM; an internal storage device built into the computer, such as any of various ROM; or an external storage device, such as a hard disk drive connected to the computer.

While the invention has been described in detail with reference to the embodiments thereof, it would be apparent to those skilled in the art that various changes and modifications may be made therein.

What is claimed is:

1. An image processing device comprising:
   a processor; and
   a memory storing computer-readable instructions therein, the computer-readable instructions, when executed by the processor, causing the image processing device to perform:
   acquiring first image data representing a first image having a plurality of pixels and second image data representing a second image having a plurality of pixels, the second image including a search region, a plurality of candidate regions being included in a part of the search region;
   selecting a candidate region from among the plurality of candidate regions in the search region;
   calculating, for the selected candidate region, a degree of similarity between a reference region and the selected candidate region, the reference region being a part of the first image;
   identifying a corresponding region in the search region, the corresponding region corresponding to the reference region;
   determining whether a first variance condition is met, the first variance condition indicating that variance among pixel values of pixels in a determination region is greater than or equal to a prescribed first value, the determination region including at least one of at least a part of the search region and at least a part of the reference region; and
   generating combined image data by using the first image data and the second image data, the combined image data representing a combined image in which the first image is combined with the second image by overlapping the reference region with the identified corresponding region,
   wherein in a first case where the first variance condition is met, the calculating is repeatedly performed while the selecting changes a selection of a candidate region from among the plurality of candidate regions until the calculating finds a degree of similarity greater than or equal to a reference value,
   wherein in the first case, once the calculating finds the degree of similarity greater than or equal to the reference value, the candidate region corresponding to the found degree of similarity is identified with the corresponding region,
   wherein in a second case where the first variance condition is not met, the calculating is repeatedly performed while the selecting changes a selection of a candidate region from among the plurality of candidate regions to obtain at least two degrees of similarity for at least two candidate regions among the plurality of candidate regions,
   wherein in the second case, the identifying identifies a candidate region having a maximum degree of similarity among the at least two degrees of similarity with the corresponding region.

2. The image processing device according to claim 1, wherein the determination region includes the reference region.

3. The image processing device according to claim 1, wherein the first variance condition is a condition concerning variation of pixel values among pixels in at least a part of the search region and variation of pixel values among pixels in at least a part of the reference region.

4. The image processing device according to claim 1, wherein in the second case, when the calculating finds one degree of similarity greater than or equal to the reference value, the calculating being further repeatedly performed while the selecting change a selection of a candidate region from among the plurality of candidate regions until the calculating finds another degree of similarity greater than or equal to the one degree of similarity,
   wherein in the second case, the identifying identifies a candidate region corresponding to the another degree of similarity with the corresponding region.

5. The image processing device according to claim 1, wherein the second image has a rectangular shape having a joining edge that is joined to the first image in forming the combined image,
   wherein the search region has a first farthest portion farthest from the joining edge among portions in the search region by a first length,
   wherein the search region includes a processed region including the candidate region that has been selected before the calculating has found the degree of similarity, the processed region having a second farthest portion farthest from the joining edge among portions in the processed region by a processed length,
   wherein the computer-readable instructions, when executed by the processor, causing the image processing device to perform modifying the search region so that the modified search region has a third farthest portion from the joining edge among portions in the modified search region by a second length different from the first length, the second length being longer than the processed length and shorter than or equal to three times the processed length.

6. The image processing device according to claim 1, wherein the computer-readable instructions, when executed by the processor, causing the image processing device to perform determining, in the second case, whether a second variance condition is met, the second variance condition indicating that variance of pixel values among pixels in an unprocessed region is greater than or equal to a prescribed second value, the unprocessed region being defined as a part of the search region that has not been selected by the selecting,
   wherein when the second condition is met, the selecting does not select a candidate region located in the unprocessed region,
   wherein the second condition is not met, the selecting selects another candidate region located in the unprocessed region and the calculating calculates a degree of similarity for the another candidate region.

7. The image processing device according to claim 1, wherein the reference value depends on whether the first variance condition is met so that the reference value when the first variance condition is not met is larger than when the first variance condition is met.

8. A non-transitory computer readable storage medium storing a set of program instructions installed on and executed by a computer, the program instructions comprising:
    acquiring first image data representing a first image having a plurality of pixels and second image data representing a second image having a plurality of pixels, the second image including a search region, a plurality of candidate regions being included in a part of the search region;
    selecting a candidate region from among the plurality of candidate regions in the search region;
    calculating, for the selected candidate region, a degree of similarity between a reference region and the selected candidate region, the reference region being a part of the first image;
    identifying a corresponding region in the search region, the corresponding region corresponding to the reference region;
    determining whether a first variance condition is met, the first variance condition indicating that variance among pixel values of pixels in a determination region is greater than or equal to a prescribed first value, the determination region including at least one of at least a part of the search region and at least a part of the reference region; and
    generating combined image data by using the first image data and the second image data, the combined image data representing a combined image in which the first image is combined with the second image by overlapping the reference region with the identified corresponding region,
    wherein in a first case where the first variance condition is met, the calculating is repeatedly performed while the selecting changes a selection of a candidate region from among the plurality of candidate regions until the calculating finds a degree of similarity greater than or equal to a reference value,
    wherein in the first case, once the calculating finds the degree of similarity greater than or equal to the reference value, the candidate region corresponding to the found degree of similarity is identified with the corresponding region,
    wherein in a second case where the first variance condition is not met, the calculating is repeatedly performed while the selecting changes a selection of a candidate region from among the plurality of candidate regions to obtain at least two degrees of similarity for at least two candidate regions among the plurality of candidate regions,
    wherein in the second case, the identifying identifies a candidate region having a maximum degree of similarity among the at least two degrees of similarity with the corresponding region.

9. A method comprising:
    acquiring first image data representing a first image having a plurality of pixels and second image data representing a second image having a plurality of pixels, the second image including a search region, a plurality of candidate regions being included in a part of the search region;
    selecting a candidate region from among the plurality of candidate regions in the search region;
    calculating, for the selected candidate region, a degree of similarity between a reference region and the selected candidate region, the reference region being a part of the first image;
    identifying a corresponding region in the search region, the corresponding region corresponding to the reference region;
    determining whether a first variance condition is met, the first variance condition indicating that variance among pixel values of pixels in a determination region is greater than or equal to a prescribed first value, the determination region including at least one of at least a part of the search region and at least a part of the reference region; and
    generating combined image data by using the first image data and the second image data, the combined image data representing a combined image in which the first image is combined with the second image by overlapping the reference region with the identified corresponding region,
    wherein in a first case where the first variance condition is met, the calculating is repeatedly performed while the selecting changes a selection of a candidate region from among the plurality of candidate regions until the calculating finds a degree of similarity greater than or equal to a reference value,
    wherein in the first case, once the calculating finds the degree of similarity greater than or equal to the reference value, the candidate region corresponding to the found degree of similarity is identified with the corresponding region,
    wherein in a second case where the first variance condition is not met, the calculating is repeatedly performed while the selecting changes a selection of a candidate region from among the plurality of candidate regions to obtain at least two degrees of similarity for at least two candidate regions among the plurality of candidate regions,
    wherein in the second case, the identifying identifies a candidate region having a maximum degree of similarity among the at least two degrees of similarity with the corresponding region.

* * * * *